United States Patent
Wan et al.

(10) Patent No.: US 7,724,307 B2
(45) Date of Patent: May 25, 2010

(54) METHOD AND SYSTEM FOR NOISE REDUCTION IN DIGITAL VIDEO

(75) Inventors: Wade K. Wan, Orange, CA (US); Jason C. Demas, Irvine, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 892 days.

(21) Appl. No.: 11/120,039

(22) Filed: May 2, 2005

(65) Prior Publication Data

US 2006/0023794 A1 Feb. 2, 2006

Related U.S. Application Data

(60) Provisional application No. 60/591,725, filed on Jul. 28, 2004.

(51) Int. Cl.
*H04N 5/00* (2006.01)
(52) U.S. Cl. .................. 348/620; 348/618; 382/261
(58) Field of Classification Search .............. 348/606, 348/607, 608, 610, 419.1, 441, 450, 451, 348/452, 618–620; 382/261, 239; 375/240.02–240.07
See application file for complete search history.

(56) References Cited

U.S. PATENT DOCUMENTS

| | | | | | |
|---|---|---|---|---|---|
| 5,539,469 | A | * | 7/1996 | Jung | 375/240.14 |
| 5,844,614 | A | * | 12/1998 | Chong et al. | 375/240.24 |
| 6,037,986 | A | * | 3/2000 | Zhang et al. | 375/240.12 |
| 7,206,453 | B2 | * | 4/2007 | Lee et al. | 382/239 |
| 2005/0128355 | A1 | * | 6/2005 | Kang et al. | 348/606 |

* cited by examiner

*Primary Examiner*—M. Lee
(74) *Attorney, Agent, or Firm*—McAndrews, Held & Malloy, Ltd.

(57) ABSTRACT

Aspects of noise reduction in digital video may comprise monitoring at least one of memory usage and memory bandwidth usage of memory utilized to process video data. The aspect may further comprise adaptively adjusting filtering of the video data according to the monitoring. At least one of impulse filtering, temporal filtering, and spatial filtering may be utilized for the filtering of the video data. At least one of the impulse filtering, the temporal filtering, and the spatial filtering may be adaptively adjusted based on the monitoring. Furthermore, at least one of motion information and edge information may be estimated from the video data for utilizing in at least one of the impulse filtering, the temporal filtering, and the spatial filtering. At least one of the estimated motion information and the estimated edge information may be adaptively adjusted based on the monitoring.

25 Claims, 15 Drawing Sheets

METHOD AND SYSTEM FOR NOISE REDUCTION IN DIGITAL VIDEO

CROSS-REFERENCE TO RELATED APPLICATIONS/INCORPORATION BY REFERENCE

This application makes reference, claims priority to, and claims the benefit of U.S. Provisional Application Ser. No. 60/591,725 filed Jul. 28, 2004.

The above application is hereby incorporated herein by reference in its entirety.

FIELD OF THE INVENTION

Certain embodiments of the invention relate to the processing of video signals. More specifically, certain embodiments of the invention relate to a method and system for noise reduction in digital video.

BACKGROUND OF THE INVENTION

When video signals are handled by electronic devices, degradation of the video signals is inevitable. When video signals are processed in analog form, any operation on the video signal may add noise to the video signal. This may happen during mixing, filtering, and/or amplifying of the video signal. This may also happen during transmission of the signals through various media, for example, wireless transmission or cable transmission. Additionally, when analog video data is copied, successive generations of the video data may deteriorate more and more until, finally, the video may have too much noise to be viewable. When in a digital form, the video signals are much less susceptible to noise due to operations on the video signals. However, some deterioration of the digital video signals may still occur. For example, some video pixel bits may get corrupted, sometimes due to noise in the electronic circuitry and at other times by soft or hard memory failures. However, generally, there is no degradation from one generation to another when making copies of digital files. This is mainly due to the use of various methods to detect the errors. Upon detection of an error, the error can either be fixed if it is simple enough, or the file can be retransmitted or re-copied. Three examples of error detection schemes are parity bit, checksum and cyclical redundancy check (CRC). Some detected bit errors can be corrected by methods such as Hamming code.

In order to make transmission of a digital video file more efficient, the file is often compressed before transmitting and then decompressed when viewing the video. Reducing noise before compression can make compression of the video more efficient. This is because some video data compression algorithms, for example, MPEG (Moving Picture Experts Group) algorithms, encode differences between corresponding areas of multiple successive video frames. Therefore, spurious noise may introduce differences between video frames that may require additional data for encoding. Similarly, the decompression of video data may also introduce noise to the output if the video data has noise in it. Generally, a noise reduction scheme may reduce the artifacts of the lossy compression to make the video more visually pleasing. Sometimes, however, an overly aggressive compression scheme may result in a lossy compression where the decompressed data cannot maintain the original quality of the video data. Still, it may be desirable to have a means of reducing noise in digital video both before it is compressed and after it is decompressed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for noise reduction in digital video, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for noise reduction in digital video. An embodiment of the invention may be utilized to process video signals while monitoring memory usage and/or memory bandwidth usage. The processing of video signals may be adaptively adjusted depending on how much memory and/or memory bandwidth is being used. Specifically, an embodiment of the invention may be utilized to reduce noise in digital video signals before compressing to increase compression efficiency. Another embodiment of the invention may be utilized after decompression of a digital bitstream to reduce noise in the decoded digital video before digital-to-analog conversion for viewer presentation.

Figure 1A:
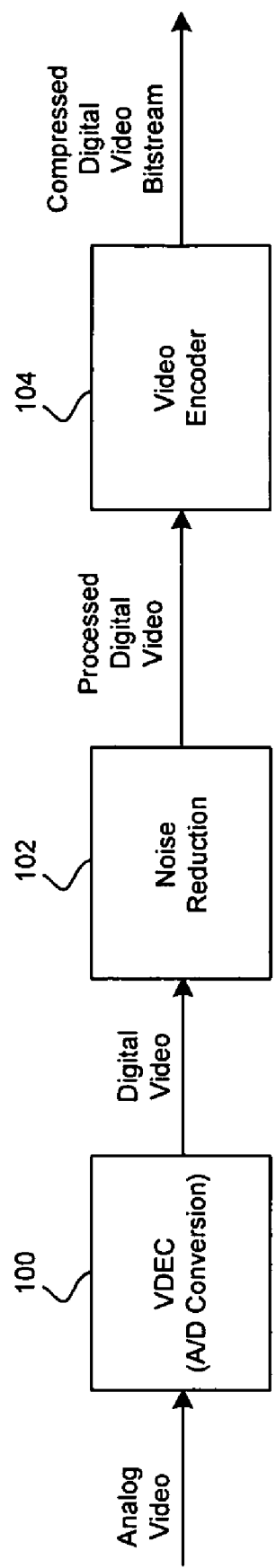
FIG. 1a is a block diagram of exemplary system for noise reduction that comprises preprocessing, in accordance with an embodiment of the invention.

FIG. 1a is a block diagram of exemplary system for noise reduction that comprises preprocessing, in accordance with an embodiment of the invention. Referring to FIG. 1a, there is shown a video decoder (VDEC) 100, a noise reduction block 102, and an MPEG video encoder 104.

The VDEC 100 may comprise suitable logic, circuitry and/or code that may be adapted to receive analog video signals and process the analog video signals, for example, by converting the analog video signals to digital video signals. Digital video signals may comprise luma and chroma portions, and each portion may be sampled at different rates. A video format, for example, a 4:2:2 chroma subsampling format, may be utilized to sample the horizontal chroma pixels at one-half the rate of the horizontal luma pixel sampling rate. The vertical sampling rate may be the same for both chroma and luma pixels. Luma pixels may contain brightness information and the chroma pixels may contain color information. Another video format, for example, the 4:2:0 chroma subsampling format, may sample the chroma pixels at one-half the rate of the luma pixels both horizontally and vertically.

The noise reduction block 102 may comprise suitable logic, circuitry and/or code that may be adapted to process the digital video signals by removing undesired noise in the digital video signals. The undesired noise may be impulse noise, which may also be known as salt-and-pepper noise. The impulse noise may manifest as a pixel whose intensity value is much larger or much smaller than that of its surrounding neighbors. This may be an aberration that may be distracting to a viewer. Additionally, the impulse noise may utilize additional bandwidth during compression, for example, by the MPEG video encoder 104. The MPEG video encoder 104 may comprise suitable logic, circuitry and/or code that may be adapted to compress digital data of the digital video signals to reduce the size of a digital video file. The reduced size of the digital video file may be desired in order to facilitate transmission of the digital video file, or reduce the memory space that may be necessary in storing the digital video file.

In operation, the VDEC 100 may be adapted to receive the analog video signals and convert the analog video signals to digital video signals by digitally sampling the analog video signals at a pre-defined sampling rate. The VDEC 100 may communicate the digital video signals to the noise reduction block 102. The noise reduction block 102 may be adapted to remove noise from the digital video signals. Noise may comprise undesired data in the digital video signals that may hamper efficient compression of the digital video signals and/or affect video display. The noise reduction block 102 may communicate the processed digital video signals to the MPEG video encoder 104. The MPEG video encoder 104 may be adapted to compress the digital video signals communicated by the noise reduction block 102. The noise reduction block 102 may be considered to have pre-processed the video signals since noise reduction occurs before the digital video signal compression.

Figure 1B:
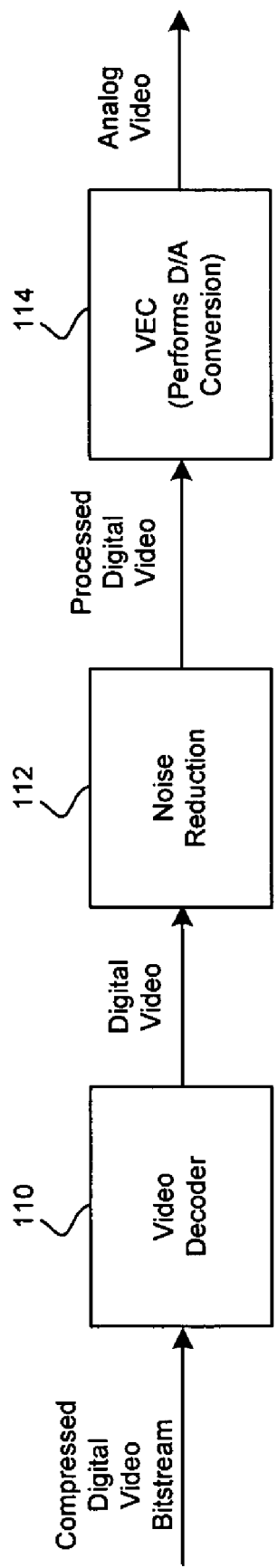
FIG. 1b is a block diagram of exemplary system for noise reduction that comprises postprocessing, in accordance with an embodiment of the invention

FIG. 1b is a block diagram of exemplary system for noise reduction that comprises postprocessing, in accordance with an embodiment of the invention. Referring to FIG. 1b, there is shown an MPEG video decoder 110, a noise reduction block 112, and a video encoder (VEC) 114.

The MPEG video decoder 110 may comprise suitable logic, circuitry and/or code that may be adapted to receive compressed digital video signals, and uncompress the compressed digital video signals. The noise reduction block 112 may be substantially similar to the noise reduction block 102 (FIG. 1a). The VEC 114 may comprise suitable logic, circuitry and/or code that may be adapted to convert the digital video signals to analog video signals.

In operation, the MPEG video decoder 110 may be adapted to receive the compressed digital video signals and uncompress the digital video signals. The video decoder 110 may communicate the uncompressed digital video signals to the noise reduction block 112. The noise reduction block 112 may be adapted to remove noise from the digital video signals. Noise may comprise undesired data in the digital video signals that may affect video display when it is presented for viewing. The noise reduction block 112 may communicate the processed digital video signals to the VEC 114. The VEC 114 may be adapted to convert the digital video signals, for example, in the 4:2:2 or 4:2:0 chroma subsampling format, communicated by the noise reduction block 112 to analog video signals.

Figure 1C:
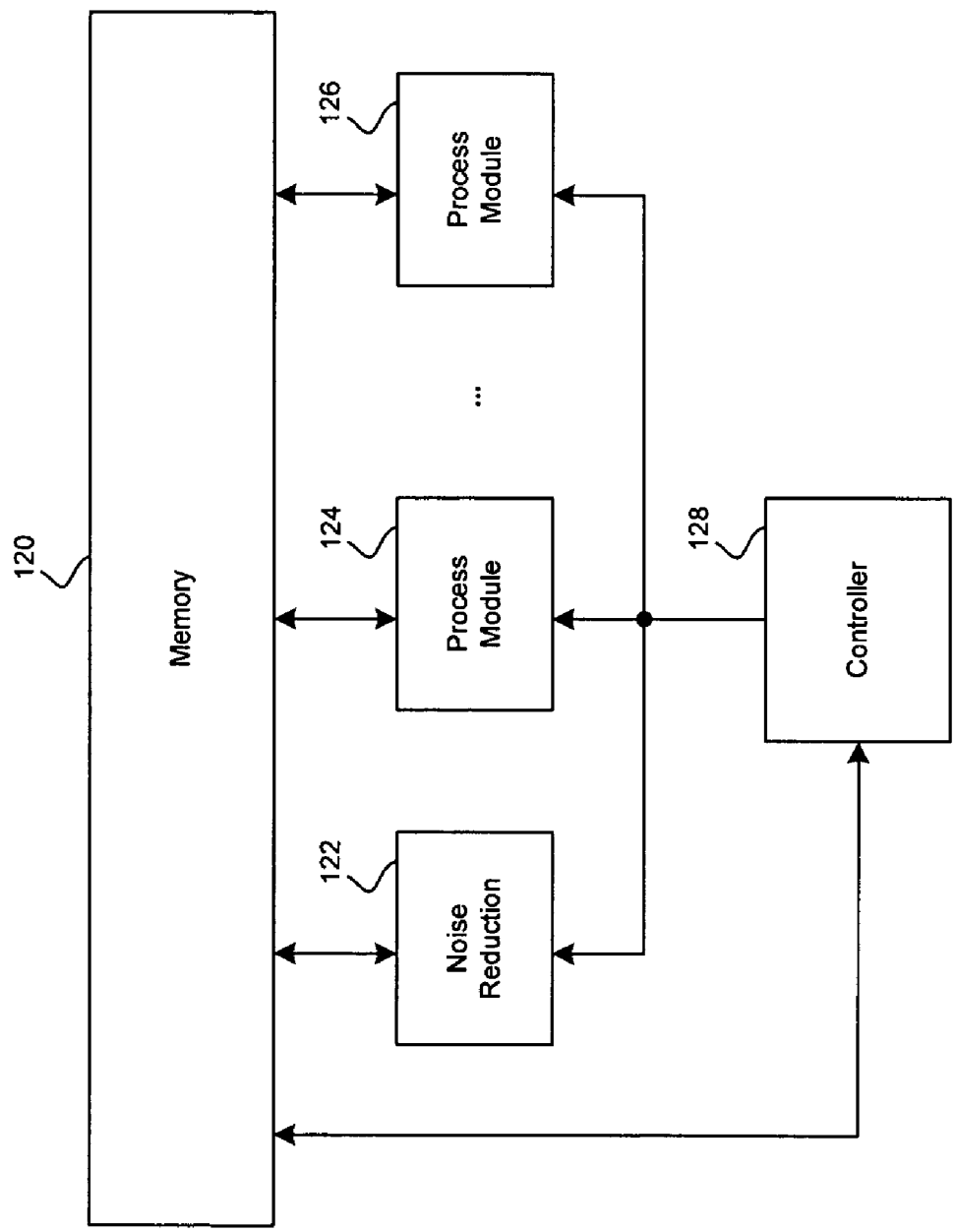
FIG. 1c is a block diagram of exemplary system for illustrating the adaptation of the memory and/or memory bandwidth utilized by the noise reduction techniques, in accordance with an embodiment of the invention.

FIG. 1c is a block diagram of exemplary system for illustrating the adaptation of the memory and/or memory bandwidth utilized by the noise reduction techniques, in accordance with an embodiment of the invention. Referring to FIG. 1c, there is shown memory block 120, the noise reduction block 122, process modules 124, . . . , 126, and a controller block 128. The memory block 120 may comprise suitable logic and/or circuitry that may be adapted to store data, and from which data can be retrieved, such as, for example, random access memory (RAM). The noise reduction module 122 may be substantially similar to the noise reduction module described in FIGS. 1a and 1b. The process modules 124, . . . , 126 may comprise suitable logic, circuitry and/or code may be adapted to process and/or control data, and utilize the memory block. For example, a process module may be a direct memory access (DMA) processor that stores and retrieves data directly from the memory block 120 to other memory addresses and/or to other process modules. The controller block 128 may comprise suitable logic, circuitry and/or code that may be adapted to control and/or monitor the memory and/or memory bandwidth utilization of various modules in a system, for example, modules such as the memory block 120, the noise reduction block 122, the process modules 124, . . . , 126, and itself, the controller block 128.

In operation, the controller block 128 may monitor the utilization of the memory block 120 by the various modules, and/or the utilization of the memory bandwidth to the memory block 120, and may change memory access and/or bandwidth allocation for the various modules in the system. For example, if memory utilization and/or memory bandwidth usage is relatively low, the controller block 128 may allow the noise reduction block 122 to use a high memory bandwidth usage mode for video processing. As the memory and/or memory bandwidth usage by the process modules 124, . . . , 126 increase, the controller block 128 may indicate to the noise reduction block 122 that it use a medium memory bandwidth usage mode. Similarly, if the memory and/or memory bandwidth usage increases still more, the controller block 128 may indicate to the noise reduction block 122 to use a low memory bandwidth usage mode. The higher memory usage and memory bandwidth usage video processing modes may generate processed video output that may be more visually pleasing to a viewer.

Figure 2A:
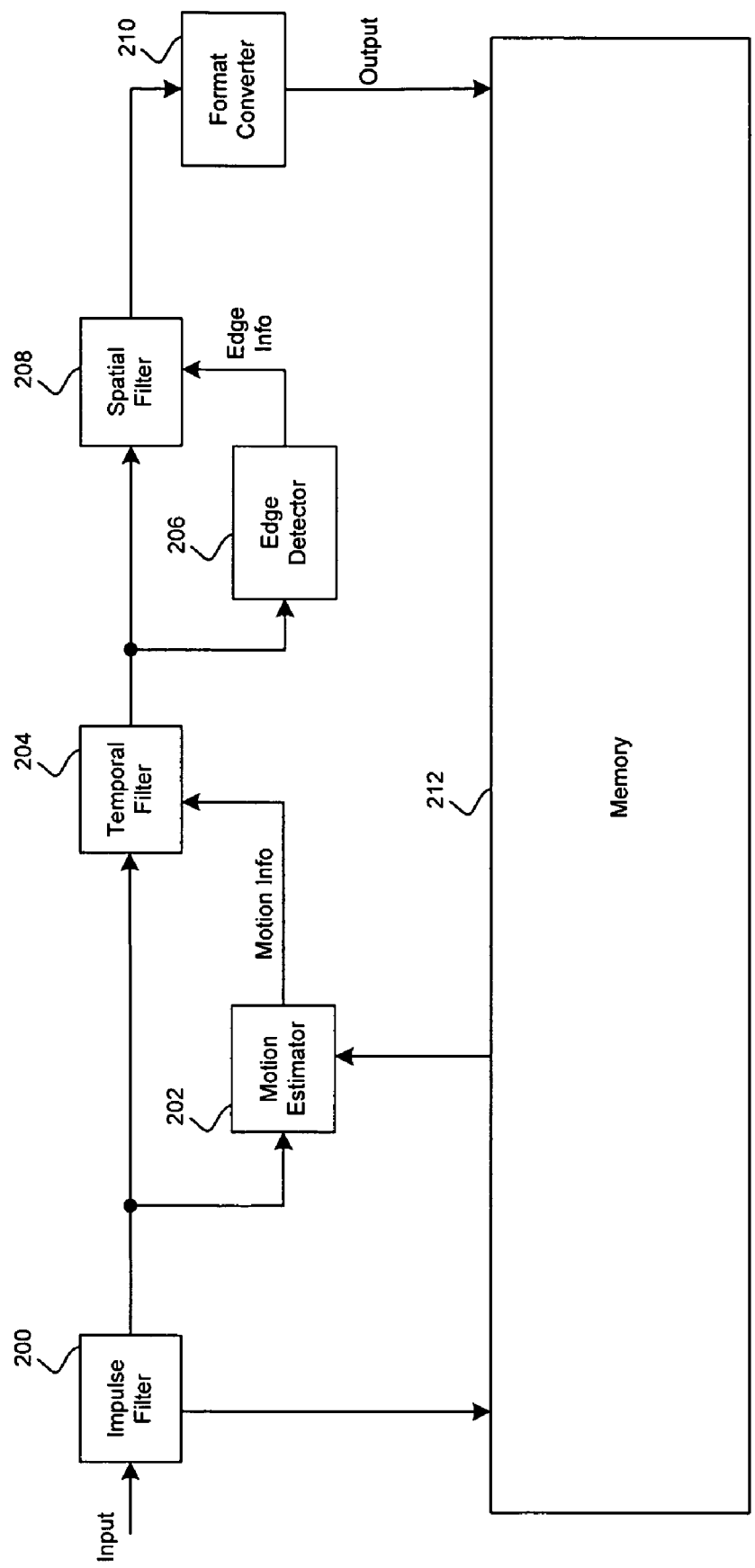
FIG. 2a is a block diagram of exemplary video processing system utilizing noise reduction techniques, in accordance with an embodiment of the invention.

FIG. 2a is a block diagram of exemplary video processing system utilizing noise reduction techniques, in accordance with an embodiment of the invention. Referring to FIG. 2a, there is shown an impulse filter 200, a motion estimator 202, a temporal filter 204, an edge detector 206, a spatial filter 208, a format converter 210, and a memory block 212.

The impulse filter 200 may comprise suitable logic, circuitry and/or code that may be adapted to process video data to remove impulse noise. The impulse filter 200 may utilize an algorithm where the detection of impulse noise may be performed identically for both luma and chroma pixels using, for example, a local 1×5 neighborhood of the pixel of interest. The 1×5 notation may indicate that five adjacent pixels are in the same horizontal line. Luma pixels may be the pixels that contain brightness information, and the chroma pixels may be the pixels that contain color information. A component video signal may comprise one luma component and two chroma components. The pixel of interest may be classified as an impulse pixel and may be replaced in various exemplary scenarios as described below. In the descriptions below, x may indicate a column, y may indicate a row, and t may indicate time. Video data for a given time instant may be referred to as a video frame.

In the first scenario, the impulse pixel intensity may be greater than the maximum value of every other pixel in the neighborhood plus an adjustable offset high_offset:

$$f(x, y, t) > \left[ \max_{i=-2,-1,1,2} f(x, y+i, t) \right] + \text{high\_offset}$$

In this case, the pixel of interest may be replaced by the maximum pixel in the neighborhood:

$$f(x, y, t) = \max_{i=-2,-1,1,2} f(x, y+i, t)$$

Separate offsets may be defined for processing luma and chroma pixels. These offsets may allow scalability of the impulse filter since increasing the high_offset value above zero may cause the impulse filter to process fewer pixels.

In the second scenario, the impulse pixel intensity may be less than the minimum value of every other pixel in the neighborhood plus an adjustable offset low_offset:

$$f(x, y, t) + \text{low\_offset} < \left[ \min_{i=-2,-1,1,2} f(x, y+i, t) \right]$$

In this case, the pixel of interest may be replaced by the minimum pixel in the neighborhood:

$$f(x, y, t) = \min_{i=-2,-1,1,2} f(x, y+i, t)$$

Separate offsets may be defined for processing luma and chroma pixels. These offsets may allow scalability of the impulse filter since increasing low_offset above zero may cause the impulse filter to process fewer pixels.

For those pixels that do not have a valid 1×5 neighborhood, for example, pixels such as the pixel 3B (FIG. 3) whose 1×5 neighborhood lies outside the video frame, pixels on the video frame boundary may be replicated to create a valid neighborhood for adaptive luma spatial filtering. For example, the 1×5 neighborhood of pixel 3B may be the five pixels 39-3A-3B-3B-3B where the last two pixels may have been pixels that have been replicated from pixel 3B. The result may be that the impulse filter uses a smaller neighborhood for comparison with the pixel of interest. Also, although the impulse filter 200 described in this embodiment of the invention may not differentiate between the various modes of memory bandwidth usages, the invention need not be so limited. In this regard, the impulse filter 200 may vary the method of impulse filtering depending on the memory bandwidth usage mode utilized. Additionally, the impulse filter 200, as described, may not utilize motion information or edge information, from, for example, the motion detector 202 and the edge detector 206, respectively, the invention need not be so limited. In this regard, the impulse filter may be adapted to utilize the motion information and/or the edge information for filtering impulse noise.

An embodiment of the invention may allow separate enabling/disabling of a 1×5 impulse filter, for example, the impulse filter 200, for luma and/or chroma pixels. In addition, the adjustable offsets high_offset and low_offset may need to be defined for both luma and chroma processing. Additionally, to support characterization and debug efforts, three registers may be defined that list the number of pixels per field where the impulse filter may have replaced the pixel of interest with either the minimum or maximum pixel value in the neighborhood. An embodiment of the invention may utilize 18 bits for luma. This may give a full accuracy for the worst case for one field of 720×486 video since $2^{18}=262,144$, and the maximum number of pixels replaced may be 720*486/2=174,960. In this regard, every other pixel may be replaced.

The motion estimator 202 may comprise suitable logic, circuitry and/or code that may be adapted to process video data to determine changes in pixel intensity with respect to time. The motion estimator 202 may utilize a reduced complexity algorithm that may estimate motion information using the luma pixels. The estimated motion information may be communicated to the temporal filter 204, and the temporal filter 204 may use the estimated motion information differently in temporal filtering of the luma and chroma pixels. The estimation of motion information may be provided on a pixel-by-pixel basis based on collocated pixels in a previous and/or a subsequent video frame and may be handled differently depending on the memory bandwidth usage mode. Collocated pixels may be pixels in different video frames that are in the same row and column positions. This may be further illustrated in FIG. 3, where A33, B33 and C33 may the collocated pixel in the previous video frame, the present video frame, and the subsequent video frame, respectively.

In accordance with an embodiment of the invention, there may be a plurality of memory bandwidth usage modes. For example, there may be a low memory bandwidth usage mode, a medium memory bandwidth usage mode, and a high memory bandwidth usage mode. The current, previous and/or subsequent video frames may not be the original input video frames, but may already have been processed by the impulse filter 200.

In the low memory bandwidth usage mode, a collocated pixel in a previous video frame may be used for estimation of motion information. The absolute difference between the pixel of interest and the collocated pixel in the previous video frame may be calculated for each pixel. If D(x,y,t) represents this value, then the equation below may be used:

$$D(x,y,t)=abs(f(x,y,t)-f(x,y,t-1))$$

For certain frames, for example, first video frames, that do not have a valid previous video frame, estimation of motion information may not need to be performed since temporal filtering may not be possible without the previous video frame.

In the medium and high memory bandwidth usage modes, the collocated pixels in the previous and subsequent video frames may be used for estimation of motion information. The maximum of the three collocated pixels minus the minimum of the three collocated pixels may be calculated for each pixel. If D(x,y,t) represents this value, then the equation below may be used:

$$D(x, y, t) = \max_{T=-1,0,1} f(x, y, t+T) - \min_{T=-1,0,1} f(x, y, t+T)$$

For certain frames, for example, the first and last video frames, that only have one neighboring video frame, motion information estimation and/or temporal filtering may not need to be performed.

The maximum value of a quantized version of D(x,y,t) in a local 2×5 neighborhood may be calculated for every pixel. The 2×5 notation may indicate that the same five horizontal position pixels are in two adjacent horizontal lines. A local 2×5 neighborhood may comprise two adjacent rows in the same video frame, and five columns of pixels in those rows. This may be illustrated in FIG. 6*a*, where the local 2×5 neighborhood may be from the previous video frame and the present video frame. If M(x,y,t) represents this value, then the equation below may be used:

$$M(x, y, t) = \left[ \max_{\substack{i=-2,-1,0,1,2 \\ j=-LINE\_OFFSET,0 \\ (i,j)\neq(0,0)}} D(x+i, y+j, t) \right] >> \text{MOTION\_QUANT}$$

where a right shift by a value of MOTION_QUANT may be used for quantization. MOTION_QUANT may be a design dependent value. M(x,y,t) may be interpreted as the local motion with small values representing low amounts of motion and high values representing high amounts of motion.

For those pixels that do not have a valid 2×5 neighborhood, for example, pixels whose 2×5 neighborhood lies outside the video frame, pixels on the video frame boundary may be replicated to create a valid neighborhood for the motion detection. For example, pixel 4B in FIG. 3 may not have a valid 2×5 neighborhood since the pixel 4B may be the last pixel in a row 4. The generated 2×5 neighborhood of the pixel 4B may be the ten pixels 39-3A-3B-3B-3B
49-4A-4B-4B-4B where the last two pixels in rows 3 and 4 may have been pixels that have been replicated from pixels 3B and 4B, respectively.

Since the motion window may compute the neighborhood maximum, this may be equivalent to taking the maximum over the smaller window of valid pixels.

Although an embodiment of the invention may have described estimating motion information using the luma pixels, the invention need not be so limited. For example, an embodiment of the invention may be adapted to utilize the luma pixels and/or either or both of the chroma pixels to estimate motion. In an exemplary embodiment of the invention, the enabling/disabling of the motion estimation may be tied to the enabling/disabling of the adaptive temporal filter. Also, the variable MOTION_QUANT that controls quantization of D(x,y,t) may be programmable. If, in an exemplary embodiment of the invention, MOTION_QUANT is used to control a right shift of 8-bit numbers, three bits may be required. An exemplary default value of 2 may be used for MOTION_QUANT, but the invention need not be so limited and other default values may be utilized.

The temporal filter 204 may comprise suitable logic, circuitry and/or code that may be adapted to filter video data utilizing information from the motion estimator 202. The temporal filter 204 may operate adaptively at the pixel level. The estimated motion information for each pixel may be mapped to an alpha blend level that may control the amount of temporal filtering performed. The final intensity value for the pixel at column x, row y, and time t may be represented by the following equation:

$$\hat{f}(x, y, t) = \frac{\alpha(x, y, t) * f(x, y, t) + (256 - \alpha(x, y, t)) * b(x, y, t)}{256}$$

where 0≦α(x,y,t)≦256 may be the alpha blend level for the pixel, f(x,y,t) may be an original intensity value for the pixel, and b(x,y,t) may be a filtered intensity value for the pixel. Therefore, it may be seen that values of α(x,y,t) closer to 0 will cause the final intensity value f̂(x,y,t) to be closer to the original intensity value f(x,y,t), and values of α(x,y,t) closer to 256 may cause the final intensity value f̂(x,y,t) to be closer to the filtered intensity value b(x, y, t).

For adaptive temporal filtering for luma pixels, at least a portion of the pixels may first be checked against the collocated pixel in the previous video frame and pixels with very large differences may not be filtered. A simple threshold condition may be checked to determine a pixel's suitability and pixels that satisfy the following inequality $$abs(f(x,y,t)-f(x,y,t-1))\geqq \text{LUMA\_MOTION\_CHECK}$$

may not be filtered. For pixels that meet the threshold condition of $$abs(f(x,y,t)-f(x,y,t-1))<\text{LUMA\_MOTION\_CHECK},$$

the adaptive temporal filtering may depend on the memory bandwidth usage mode.

Similarly, a simple threshold condition may be checked for each chroma pixel to determine the pixel's suitability. Pixels of either chroma component that satisfy the following inequality $$abs(f(x,y,t)-f(x,y,t-1))\geqq \text{CHROMA\_MOTION\_CHECK}$$

may not be filtered. For the remaining pixels that do not satisfy the inequality for both components, the adaptive temporal filtering may depend on the memory bandwidth usage mode. The adaptive temporal filtering may be the same for both luma and chroma pixels.

In the low memory bandwidth usage mode, temporal filtering for pixels that meet the threshold condition may be performed as follows:

$$\hat{f}(x, y, t) = \frac{\alpha(x, y, t) * f(x, y, t) + (256 - \alpha(x, y, t)) * b(x, y, t)}{256}$$

$$b(x, y, t) = \frac{TCOEFF[0] * f(x, y, t) + TCOEFF[1] * f(x, y, t-1)}{256}$$

where f(x,y,t) may denote the input to the temporal filter 204, b(x,y,t) may denote a filtered result, and f̂(x,y,t) may denote the output of the temporal filter 204. TCOEFF may be an array of coefficient values, and the coefficient values may be implementation dependent. This temporal filtering may be interpreted as an alpha blend between the original input f(x,y,t) and the filtered result b(x,y,t). This may correspond to the use of a 2-tap temporal finite impulse response (FIR) filter with impulse response of:

$$h[t] = \begin{cases} \dfrac{TCOEFF[0]}{256}, & t = 0 \\ \dfrac{TCOEFF[1]}{256}, & t = 1 \end{cases}$$

at each pixel. For example, if the local motion M(x,y,t) is estimated to be low, the alpha blend level α(x,y,t) may be low and the filtered result b(x,y,t) may weight the alpha blend more heavily. If the local motion M(x,y,t) is estimated to be high, the alpha blend level α(x,y,t) may be high and the alpha blend may use more of the original input f(x,y,t).

In the medium memory bandwidth usage mode, temporal filtering for pixels that meet the threshold condition may be performed as follows:

$$\hat{f}(x, y, t) = \frac{\alpha(x, y, t) * f(x, y, t) + (256 - \alpha(x, y, t)) * b(x, y, t)}{256}$$

$$b(x, y, t) = \frac{TCOEFF[0] * f(x, y, t) + TCOEFF[1] * f(x, y, t-1) + TCOEFF[2] * f(x, y, t+1)}{256}$$

This temporal filtering may be interpreted as an alpha blend between the original input f(x,y,t) and the filtered result b(x,y,t). Accordingly, filtering may be achieved utilizing a 3-tap temporal FIR filter with impulse response of $$h[t] = \begin{cases} \dfrac{TCOEFF[2]}{256}, & t = -1 \\ \dfrac{TCOEFF[0]}{256}, & t = 0 \\ \dfrac{TCOEFF[1]}{256}, & t = 1 \end{cases}$$

at each pixel. For example, if the local motion M(x,y,t) is estimated to be low, the alpha blend level α(x,y,t) may be low and the filtered result b(x,y,t) may weight the alpha blend more heavily. If the local motion M(x,y,t) is estimated to be high, the alpha blend level α(x,y,t) may be high and the alpha blend may use more of the original input f(x,y,t).

In the high memory bandwidth usage mode, temporal filtering for pixels that meet the threshold condition may be performed as follows:

$$\hat{f}(x, y, t) = \frac{\alpha(x, y, t) * f(x, y, t) + (256 - \alpha(x, y, t)) * b(x, y, t)}{256}$$

$$b(x, y, t) = \frac{\begin{pmatrix} TCOEFF[0] * f(x, y, t) + TCOEFF[1] * f(x, y, t-1) + \\ TCOEFF[2] * f(x, y, t+1) + TCOEFF[3] * \hat{f}(x, y, t-1) \end{pmatrix}}{256}$$

Since f̂(x,y,t−1) may be used in the filtered result, this may be a recursive temporal filter, for example, an infinite impulse response (IIR) filter. This temporal filtering may be interpreted as an alpha blend between the original input f(x,y,t) and the filtered result. Accordingly, filtering may be achieved utilizing a 2-tap temporal IIR and/or 3-tap temporal FIR filter with frequency response of:

$$H(z) = \frac{TCOEFF[2] \cdot z + TCOEFF[0] + TCOEFF[1] \cdot z^{-1}}{256 - TCOEFF[3] \cdot z^{-1}}$$

at each pixel. The transfer function H(z) may be a discrete transfer function utilized for discrete time Fourier transforms. If the local motion M(x,y,t) is estimated to be low, the alpha blend level α(x,y,t) may be low and the alpha blend may weight the filtered result b(x,y,t) more heavily. If the local motion M(x,y,t) is estimated to be high, the alpha blend level α(x,y,t) may be high and the alpha blend may use more of the original input f(x,y,t).

Although the temporal filter 204, as described, may not utilize edge information, from, for example, the edge detector 206, the invention need not be so limited. In this regard, the temporal filter 204 may be adapted to utilize the edge information for temporal filtering.

The edge detector 206 may comprise suitable logic, circuitry and/or code that may be adapted to estimate, or detect, edge information in regions of video and communicate the edge information to a spatial filter. An embodiment of the invention may utilize Sobel filters for horizontal and vertical edge detection. For example, a 3×3 horizontal Sobel filter may be represented by

| 1 | 2 | 1 |
|---|---|---|
| 0 | 0 | 0 |
| -1 | -2 | -1 | and a 3×3 vertical Sobel filter may be represented by

| 1 | 0 | -1 |
|---|---|---|
| 2 | 0 | -2 |
| 1 | 0 | -1 |

Edge detection may be performed on luma pixels. For those pixels that do not have a valid 3×3 neighborhood, for example, pixels whose 3×3 neighborhood lies outside the video frame, pixels on the video frame boundary may be replicated to create a valid neighborhood for the motion detection. For example, pixel 4B in FIG. 3 may not have a valid 3×3 neighborhood since the pixel 4B may be the last pixel in a row 4, and row 4 may be the last row in the video frame. The generated 3×3 neighborhood of the pixel 4B may be the nine pixels 3A-3B-3B 4A-4B-4B 4A-4B-4B where the last pixel in rows 3 and 4 may have been pixels that have been replicated from pixels 3B and 4B, respectively. Additionally, since there is no subsequent row after row 4, the subsequent row may be the same as the row 4. Since the motion window may compute the neighborhood maximum, this may be equivalent to taking the maximum over the smaller window of valid pixels.

The maximum of the absolute value of the two outputs of the two Sobel filters may then be used to represent the edge activity for each pixel. If an embodiment of the invention utilizes 8-bit arithmetic, then values greater than 255 may be set to 255. The maximum edge activity in a three pixel horizontal window around the pixel of interest may be computed as the local edge activity. $E(x,y,t)$ may represent this measured edge activity, and this may be communicated to the spatial filter 208. In an exemplary embodiment of the invention, the enabling/disabling of the edge detector 206 may be tied to the enabling/disabling of the spatial filter 208. However, there may not be other values for the edge detector 206 that may need to be set in registers.

Although an embodiment of the invention may have described detecting, or estimating, edge information using the luma pixels, the invention need not be so limited. For example, an embodiment of the invention may be adapted to utilize the luma pixels and/or either or both of the chroma pixels to detect edge information. Additionally, although the edge detector 206 described in this embodiment of the invention may not have taken in to account the various memory bandwidth usage modes, the invention need not be limited in this manner. In this regard, the edge detector 206 may vary the method of edge detection depending on the memory bandwidth usage mode utilized.

The spatial filter 208 may comprise suitable logic, circuitry and/or code that may be adapted to filter the video data utilizing the measured edge activity $E(x,y,t)$ communicated by the edge detector 206. Although the measured edge activity $E(x,y,t)$ may be calculated only from the luma pixels, the spatial filter 208 may apply it differently for adaptive spatial filtering of the luma and chroma pixels. The spatial filter may only filter pixels that do not have high edge activity since high spatial activity may tend to mask noise. In an embodiment of the invention, the spatial filter 208 may filter adaptively based on a strength of a detected edge. For example, a stronger filter may be applied when a low amount of edge detail is detected.

For at least a portion of the luma pixels, the spatial filter 208 may compare the measured local activity $E(x,y,t)$ to, for example, four adjustable register values to adaptively select between four 5-tap FIR filters and the possibility of not filtering as follows:

If $E(x,y,t)$>=SPATIAL_LUMA_HEDGE[3], do not filter.

If SPATIAL_LUMA_HEDGE[2]<=$E(x,y,t)$<SPATIAL_LUMA_HEDGE[3], use the following filter: ½[0 2 12 2 0]

If SPATIAL_LUMA_HEDGE[1]<=$E(x,y,t)$<SPATIAL_LUMA_HEDGE[2], use the following filter: 1/16[1 3 8 3 1]

If SPATIAL_LUMA_HEDGE[0]<=$E(x,y,t)$<SPATIAL_LUMA_HEDGE[1], use the following filter: 1/16[2 3 6 3 2]

If $E(x,y,t)$<SPATIAL_LUMA_HEDGE[0], use the following filter: 1/16[3 3 4 3 3], where SPATIAL_LUMA_HEDGE may be an array whose values may be implementation dependent. For those pixels that do not have a valid 1×5 neighborhood, for example, pixels such as the pixel 3B (FIG. 3) whose 1×5 neighborhood lies outside the video frame, pixels on the video frame boundary may be replicated to create a valid neighborhood for adaptive luma spatial filtering. For example, the 1×5 neighborhood of pixel 3B may be the five pixels 39-3A-3B-3B-3B where the last two pixels may have been pixels that have been replicated from pixel 3B.

For at least a portion of chroma pixels, a measured local activity $E(x,y,t)$ may be compared to, for example, four adjustable register values to adaptively select between four 3-tap FIR filters and the possibility of not filtering. Although the decision criteria may be the same as utilized by the luma processing, the filters used on the chroma pixels may be different:

If $E(x,y,t)$>=SPATIAL_CHROMA_HEDGE[3], do not filter.

If SPATIAL_CHROMA_HEDGE[2]<=$E(x,y,t)$<SPATIAL_CHROMA_HEDGE[3], use the following filter: 1/16[2 12 2]

If SPATIAL_CHROMA_HEDGE[1]<=$E(x,y,t)$<SPATIAL_CHROMA_HEDGE[2], use the following filter: 1/16[3 10 3]

If SPATIAL_CHROMA_HEDGE[0]<=$E(x,y,t)$<SPATIAL_CHROMA_HEDGE[1], use the following filter: 1/16[4 8 4]

If $E(x,y,t)$<SPATIAL_CHROMA_HEDGE[0], use the following filter: 1/16[5 6 5], where SPATIAL_CHROMA_HEDGE may be an array whose values may be implementation dependent. For those pixels that do not have a valid 1×3 neighborhood, for example, the pixel such as the pixel 4B (FIG. 5) whose 1×3 neighborhood lies outside the video frame, pixels on the video frame boundary may be replicated to create a valid neighborhood for adaptive chroma spatial filtering. For example, the 1×3 neighborhood of pixel 4B may be the three pixels 4A-4B-4B where the last pixel may have been a pixel that has been replicated from pixel 4B.

Additionally, although the spatial filter 208 described in this embodiment of the invention may not have taken in to account the various memory bandwidth usage modes, the invention need not be limited in this manner. In this regard, the spatial filter 208 may vary the method of spatial filtering depending on the memory bandwidth usage mode utilized. Also, although the spatial filter 208, as described, may not utilize motion information from, for example, the motion detector 202, the invention need not be so limited. In this regard, the spatial filter 208 may be adapted to utilize the motion information for spatial filtering.

The format converter 210 may comprise suitable logic, circuitry and/or code that may be adapted to convert video data from one video format to another video format. In one embodiment of the invention, the format converter 210 may convert video data from 4:2:2 chroma subsampling format to a 4:2:0 chroma subsampling format. The 4:2:2 chroma subsampling format may comprise video data where the chroma is sampled at one-half the horizontal frequency of the luma, and where the chroma is sampled at the same vertical frequency as the luma. The 4:2:0 chroma subsampling format may comprise video data where the chroma is sampled at one-half the horizontal frequency of the luma and at one-half the vertical frequency of the luma. The memory block 212 may be substantially similar to the memory block 120 (FIG. 1c). Additionally, although the format converter 210 described in this embodiment of the invention may not have taken in to account the various memory bandwidth usage modes, the invention need not be limited in this manner. In this regard, the format converter 210 may vary the method of format conversion depending on the memory bandwidth usage mode utilized.

In operation, digital video signals comprising video data may be communicated to the impulse filter 200. The digital video signals may be in the 4:2:2 chroma subsampling format. The impulse filter 200 may detect and remove impulse pixels that have a much larger value or a much smaller value than neighboring pixels within a predetermined area. These pixels may represent high frequency content that may not only be very distracting to a viewer but may also be inefficient to compress. The use of bits to compress these impulse pixels may take away bandwidth that may be used more effectively on other parts of the video data.

The impulse filter 200 may communicate the impulse filtered video signal to the memory block 212, the motion estimator 202 and the temporal filter 204. The impulse filtered video signal may be stored in the memory block 212, and may be communicated to the motion estimator 202 and to the temporal filter 204 after being suitably delayed. The stored video signal in the memory block 212 may be communicated as an output of the exemplary video processing system. The amount of delay may depend on a memory bandwidth usage mode. The memory bandwidth mode may be indicated by a controller, for example, the controller block 128 (FIG. 1c), which may be monitoring memory usage and memory bandwidth usage.

The low memory bandwidth usage mode may need the least amount of memory and/or memory bandwidth. The high memory bandwidth usage mode may need the most amount of memory and/or memory bandwidth. The medium memory bandwidth usage mode may need memory and memory bandwidth in between the low memory bandwidth usage mode and/or the high memory bandwidth usage mode, respectively. The specific amounts of memory and memory bandwidth for each mode may depend on implementation and design considerations.

The motion estimator 202 may utilize a reduced complexity algorithm that may estimate motion information using only the luma pixels of the delayed and undelayed video signals. The estimated motion information may be communicated to the temporal filter 204, and the temporal filter 204 may use the estimated motion information in temporal filtering of the luma and chroma pixels of the video signals. The delayed and undelayed video signals may be the time-relative video frames, for example, a present video frame, a previous video frame, and a subsequent video frame. The estimation of motion information may be on a pixel-by-pixel basis using the collocated pixels in the present, previous and/or subsequent video frames and may be handled differently depending on the memory bandwidth usage mode.

The temporal filter 204 may utilize the motion estimation information for adaptive temporal filtering of the luma and chroma pixels. Every luma pixel may first be checked against the collocated luma pixel in the previous video frame, and luma pixels whose differences in intensity fall within a certain range may be filtered. Each chroma pixel may also be compared in a similar manner. However, pixels associated with both components of chroma must satisfy the threshold condition before the chroma may be filtered. If the chroma is to be filtered, then the chroma pixels may be filtered in a somewhat similar manner as luma pixels. Both luma and chroma pixels may be filtered differently depending on the memory bandwidth usage mode.

The temporally filtered video signal may be communicated to the edge detector 206 and to the spatial filter 208. The edge detector 206 may utilize filters, for example, Sobel filters, to detect horizontal and vertical edges. The edge detector 206 may only process luma filters since edge detection may only be concerned with changes in relative brightness of neighboring pixels. The edge information may be communicated to the spatial filter 208. The spatial filter 208 may utilize the edge information from the edge detector 206 to spatially filter both the luma and chroma pixels. The spatially filtered video signal may be communicated to the format converter 210, which may convert the video signal from 4:2:2 chroma subsampling format to 4:2:0 chroma subsampling format. The output of the format converter 210 may be stored in the memory block 212, and this may be communicated as another output of the exemplary video processing system.

The algorithms described for embodiments of the invention may be configured to receive video frames of input video data. These video frames may either be composed of interleaved fields that are separated in time, or a complete video frame where every line represents data at the same instant of time. The video processing may rely on the definition of the two neighboring lines of video data to any particular line of interest. For progressive content, the lines above and below may be the correct neighboring lines. For interlaced content, the lines above and below may not be temporally coincident with the line of interest. In this case, the lines that are two lines above and two lines below the line of interest may be the closest lines at the same instant of time. To facilitate this, a defined variable that may indicate progressive content or interlaced content may be communicated to at least one of the blocks described in FIG. 2a. The definition of this variable may allow the algorithms described in the embodiment of the invention to apply to either progressive or interlaced content since neighboring lines may be defined using this variable.

Figure 2B:
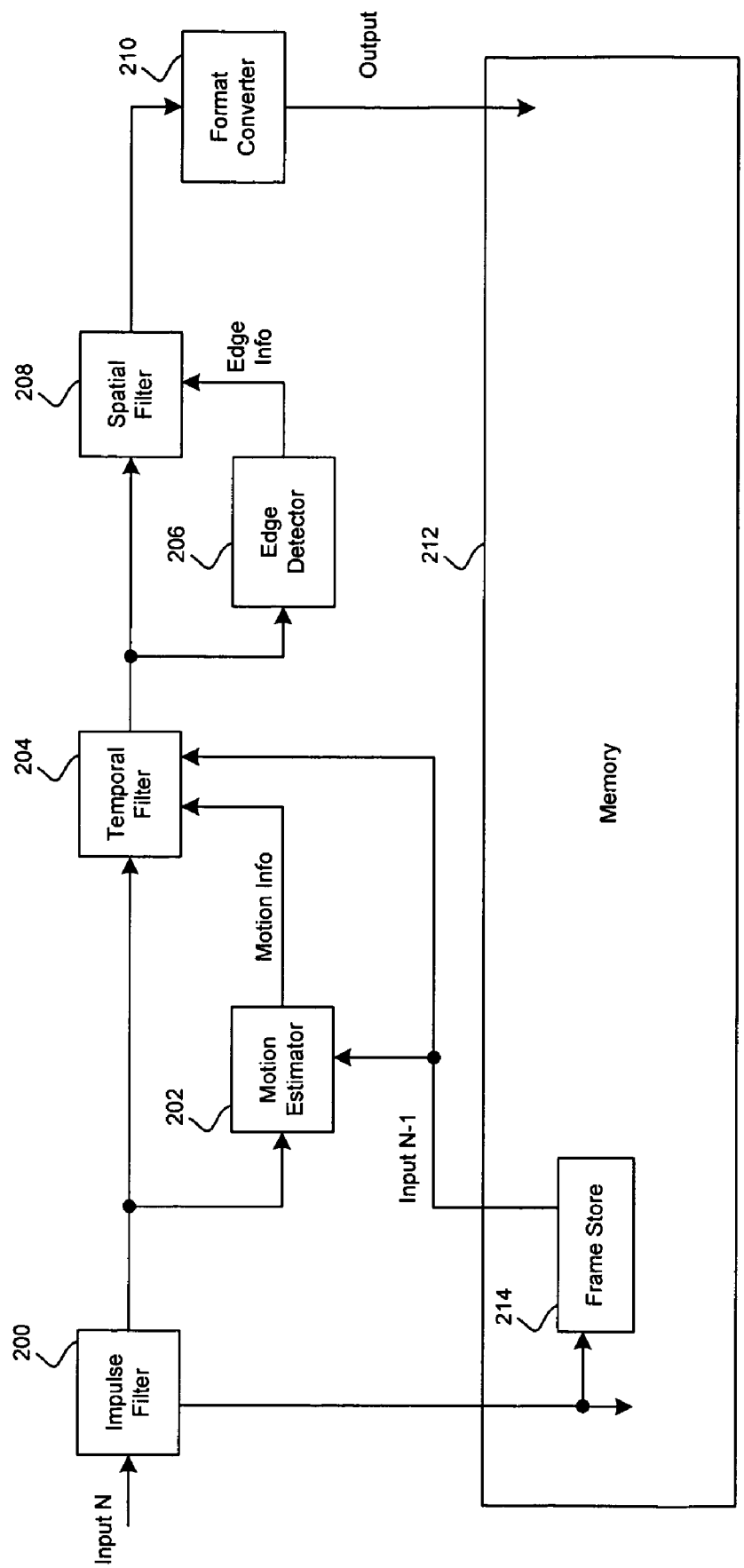
FIG. 2b is a block diagram of exemplary system illustrating low memory bandwidth usage mode for video processing utilizing noise reduction techniques, for example, of FIG. 2a, in accordance with an embodiment of the invention.

FIG. 2b is a block diagram of exemplary system illustrating low memory bandwidth usage mode for video processing utilizing noise reduction techniques, for example, of FIG. 2a, in accordance with an embodiment of the invention. Referring to FIG. 2b, there is shown the impulse filter 200, the motion estimator 202, the temporal filter 204, the edge detector 206, the spatial filter 208, the format converter 210, and the memory block 212. The blocks 200-212 may be substantially similar to the respective blocks described in FIG. 2a. The memory block 212 may comprise a frame store 214. The frame store 214 may be a portion of the memory block 212 that may be adapted to store portions of the digital video signals. Specifically, the frame store 214 may be adapted to store a video frame of the digital video signals.

In operation, the impulse filter 200 may communicate the impulse filtered video signal to the frame store 214, to the memory block 212, to the motion estimator 202 and to the temporal filter 204. The impulse filtered video signal may be stored in the frame store 214, and communicated to the motion estimator 202 and to the temporal filter 204 after an appropriate time. The delayed video signals from the frame store 214 may be synchronized with the next frame of the video signals from the impulse filter. In this manner, the motion estimator 202 and the temporal filter 204 may utilize the video signals communicated from the impulse filter 200 as the present video frame, and the video signals communicated from the frame store 214 as the previous video frame. The impulse filtered video signals from the impulse filter 200 may also be stored in the memory block 200 for further processing, or as a copy of the video signals being processed. The operation of the remaining blocks of the FIG. 2b may be similar to the operation of the respective blocks described with respect to FIG. 2a.

Figure 2C:
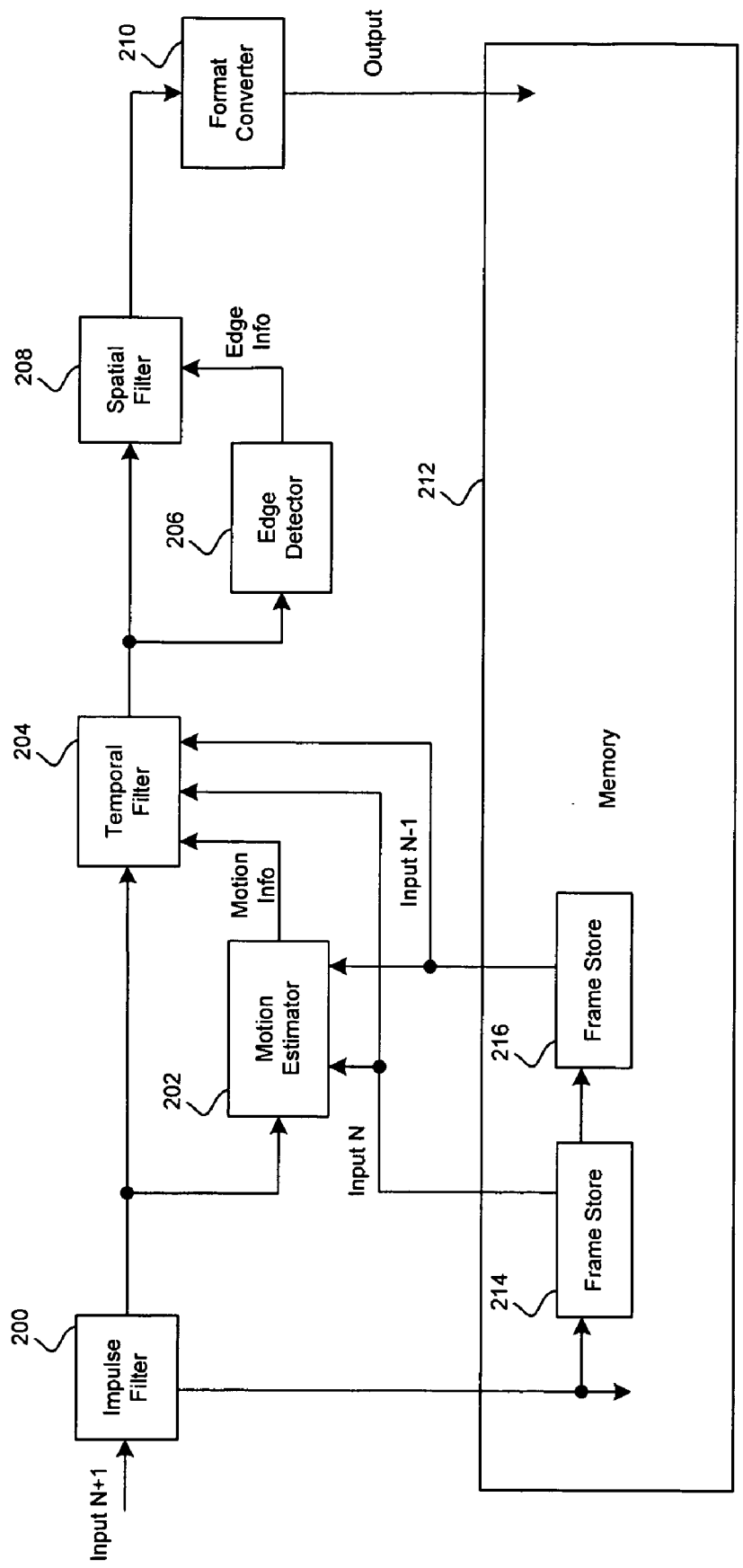
FIG. 2c is a block diagram of exemplary system illustrating medium memory bandwidth usage mode for video processing utilizing noise reduction techniques, for example, of FIG. 2a, in accordance with an embodiment of the invention.

FIG. 2c is a block diagram of exemplary system illustrating medium memory bandwidth usage mode for video processing utilizing noise reduction techniques, for example, of FIG. 2a, in accordance with an embodiment of the invention. Referring to FIG. 2c, there is shown the impulse filter 200, the motion estimator 202, the temporal filter 204, the edge detector 206, the spatial filter 208, the format converter 210, and the memory block 212. The blocks 200-212 may be substantially similar to the respective blocks described in FIG. 2a. The memory block 212 may comprise frame stores 214 and 216. The frame stores 214 and 216 may be portions of the memory block 212 that may be adapted to store portions of the digital video signals. Specifically, the frame stores 214 and 216 may store a video frame of the digital video signals.

In operation, the impulse filter 200 may communicate the impulse filtered video signal to the frame stores 214 and 216, to the memory block 212, to the motion estimator 202 and to the temporal filter 204. The impulse filtered video signal may be stored in the frame store 214, and, after an appropriate delay, may be communicated to the frame store 216 and to the motion estimator 202 and to the temporal filter 204. The video signals from the frame store 216 may be communicated to the motion estimator 202 and the temporal filter 204 after an appropriate delay. In this manner, the delayed video signals from the frame store 214 may be the present video frame and the delayed video signals from the frame store 216 may be the previous video frame. The undelayed video signals from the impulse filter 200 may be the next video frame. Accordingly, the motion estimator 202 and the temporal filter 204 may receive the present video frame, the previous video frame and the next video frame to utilize for motion estimation and temporal filtering. The impulse filtered video signals from the impulse filter 200 may also be stored in the memory block 200 for further processing at a later time, or as a copy of the video signals being processed. The operation of the remaining blocks of the FIG. 2c may be similar to the operation of the respective blocks described with respect to FIG. 2a.

Figure 2D:
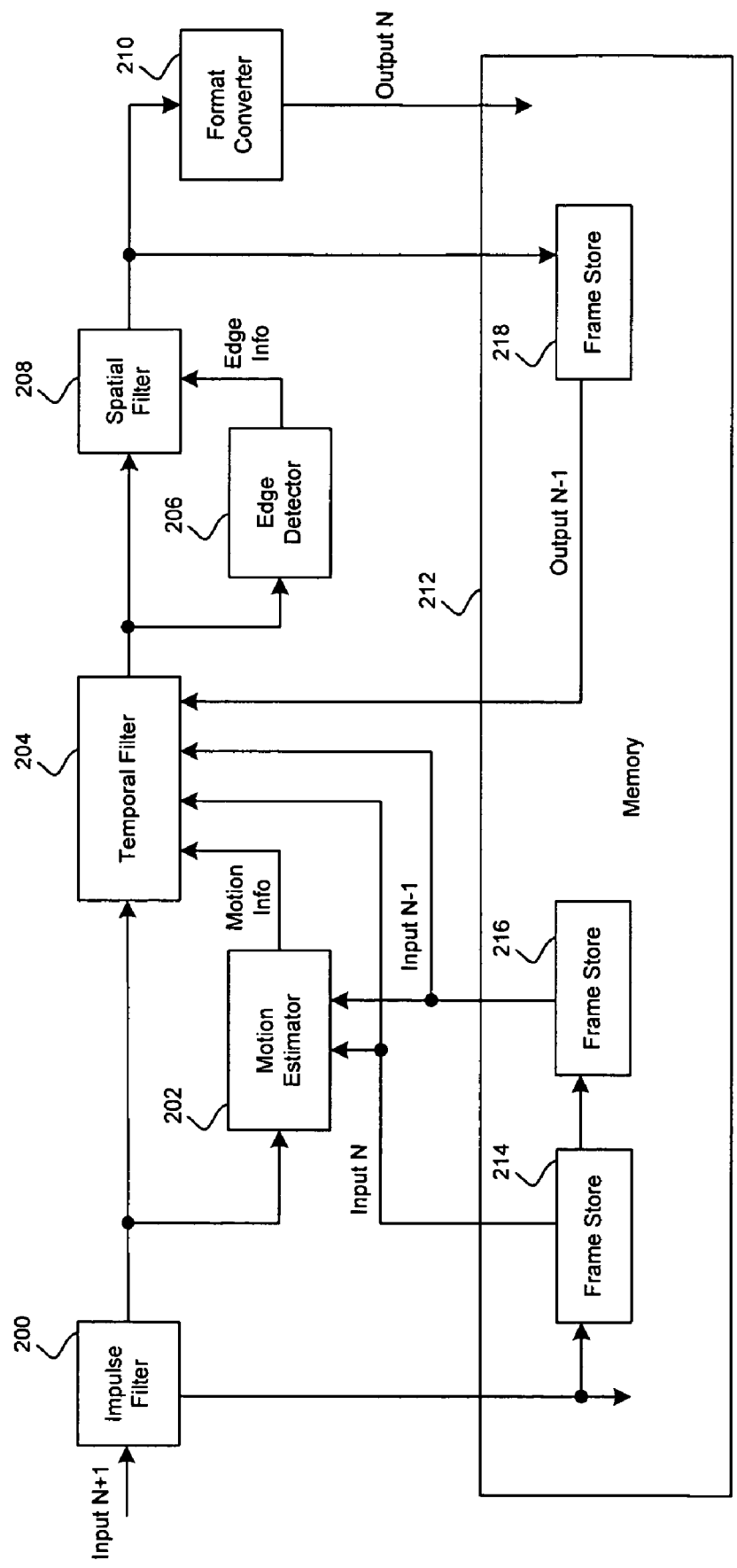
FIG. 2d is a block diagram of exemplary system illustrating high memory bandwidth usage mode for video processing utilizing noise reduction techniques, for example, of FIG. 2a, in accordance with an embodiment of the invention.

FIG. 2d is a block diagram of exemplary system illustrating high memory bandwidth usage mode for video processing utilizing noise reduction techniques, for example, of FIG. 2a, in accordance with an embodiment of the invention. Referring to FIG. 2d, there is shown the impulse filter 200, the motion estimator 202, the temporal filter 204, the edge detector 206, the spatial filter 208, the format converter 210, and the memory block 212. The blocks 200-212 may be substantially similar to the respective blocks described in FIG. 2a. The memory block 212 may comprise frame stores 214, 216 and 218. The frame stores 214, 216 and 218 may be portions of the memory block 212 that may be adapted to store portions of the digital video signals. Specifically, the frame stores 214, 216 and 218 may store a video frame of the digital video signals.

In operation, the video processing of FIG. 2d may be similar for the most part to the video processing of FIG. 2c. However, the difference may be that the spatially filtered video signal from the spatial filter 208 may be communicated to the format converter 210 and to the frame store 218. The format converter 210 may function as described in FIG. 2a. The video signal communicated to the frame store 218 may be stored, and after an appropriate delay, may be communicated to the temporal filter 204. Accordingly, the temporal filter 204, in the high memory bandwidth usage mode, may receive the present video frame, the previous video frame, the next video frame, and, in addition, the previous output video frame from the frame store 218 for temporal filtering.

Figure 3:
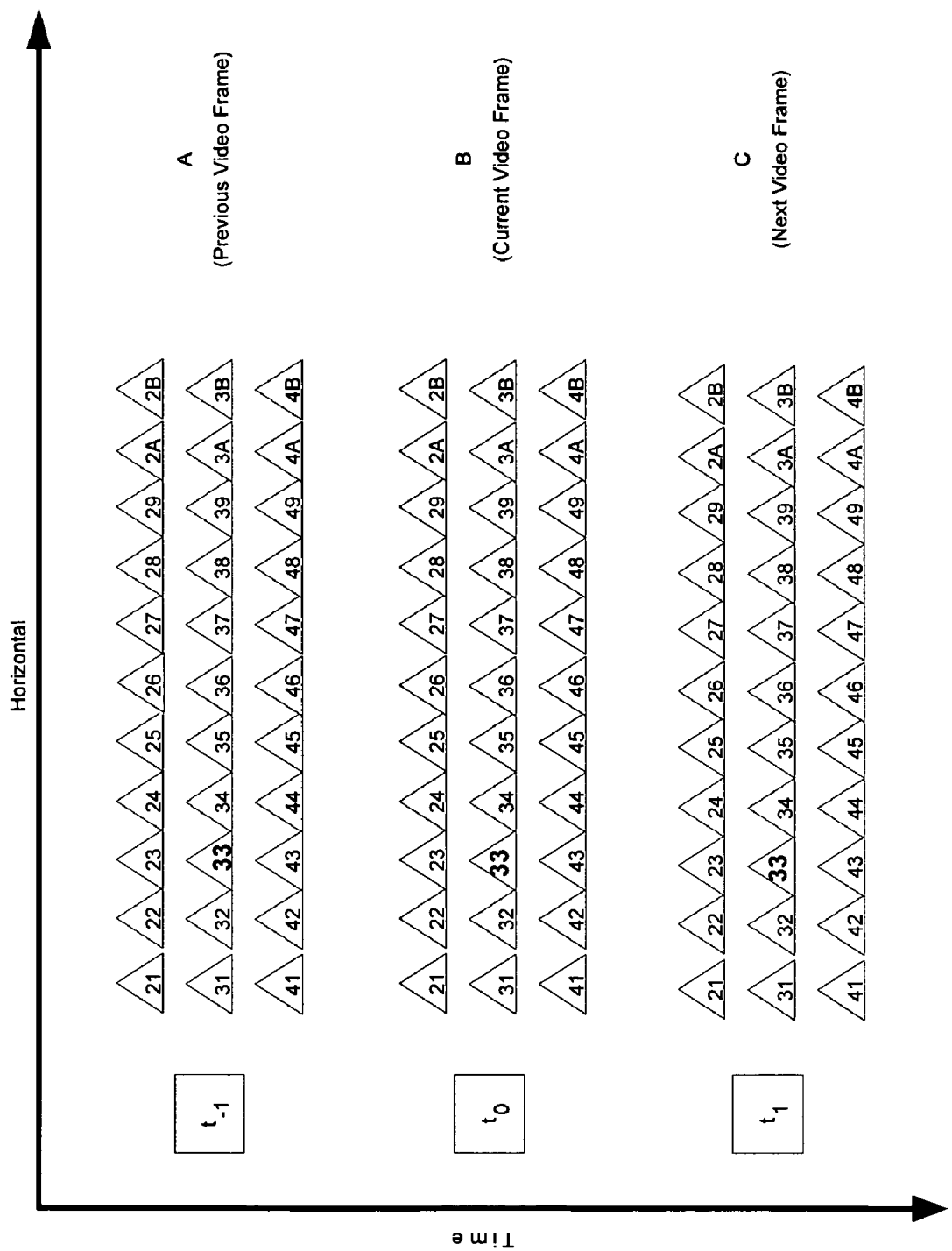
FIG. 3 illustrates a constellation definition of exemplary system that shows how a specific pixel is specified, in accordance with an embodiment of the invention.

FIG. 3 illustrates a constellation definition of exemplary system that shows how a specific pixel is specified, in accordance with an embodiment of the invention. Referring to FIG. 3, there is shown three groups of pixels corresponding to times $t_1$, $t_0$ and $t_1$. The pixels at time $t_1$ may be the pixels from the previous video frame, the pixels from time to may be the pixels from the present video frame, and the pixels from time $t_1$ may be from the next video frame. Each group shows the same three rows of pixels, labeled from 21 to 4B, using hexadecimal notation. The first digit of each hexadecimal label may indicate the row of the pixel, and the second digit may indicate the horizontal position of the pixel.

Accordingly, a three-character label that may define a common syntax for pixels may have the first character specify the video frame and the second and third characters specify the row and horizontal position of the pixel. The first character may be A for the previous video frame, B for the current video frame, and C for the next video frame. When this syntax is used, it may be assumed that consecutive rows may be from the same instant in time. That is, the issue of whether the data represents fields or frames may already have been taken into account.

In this figure, pixel B33 may be the current pixel of interest. Therefore, pixel A33 may be the collocated pixel in the previous frame, and pixel C33 may be the collocated pixel in the subsequent frame. Pixel B32 may be a temporally coincident pixel to the left of the pixel of interest and pixel B23 may a temporally coincident pixel above the pixel of interest. For frame data, this pixel may be on the line above the pixel of interest and for field data, this pixel may be two lines above the pixel of interest. Additionally, $CY_1Z_1$-$Y_2Z_2$ may be the notation to represent the set of pixels in the video frame C comprising all the pixels from row $Y_1$, horizontal position $Z_1$ to row $Y_2$, horizontal position $Z_2$, inclusive.

Figure 4:
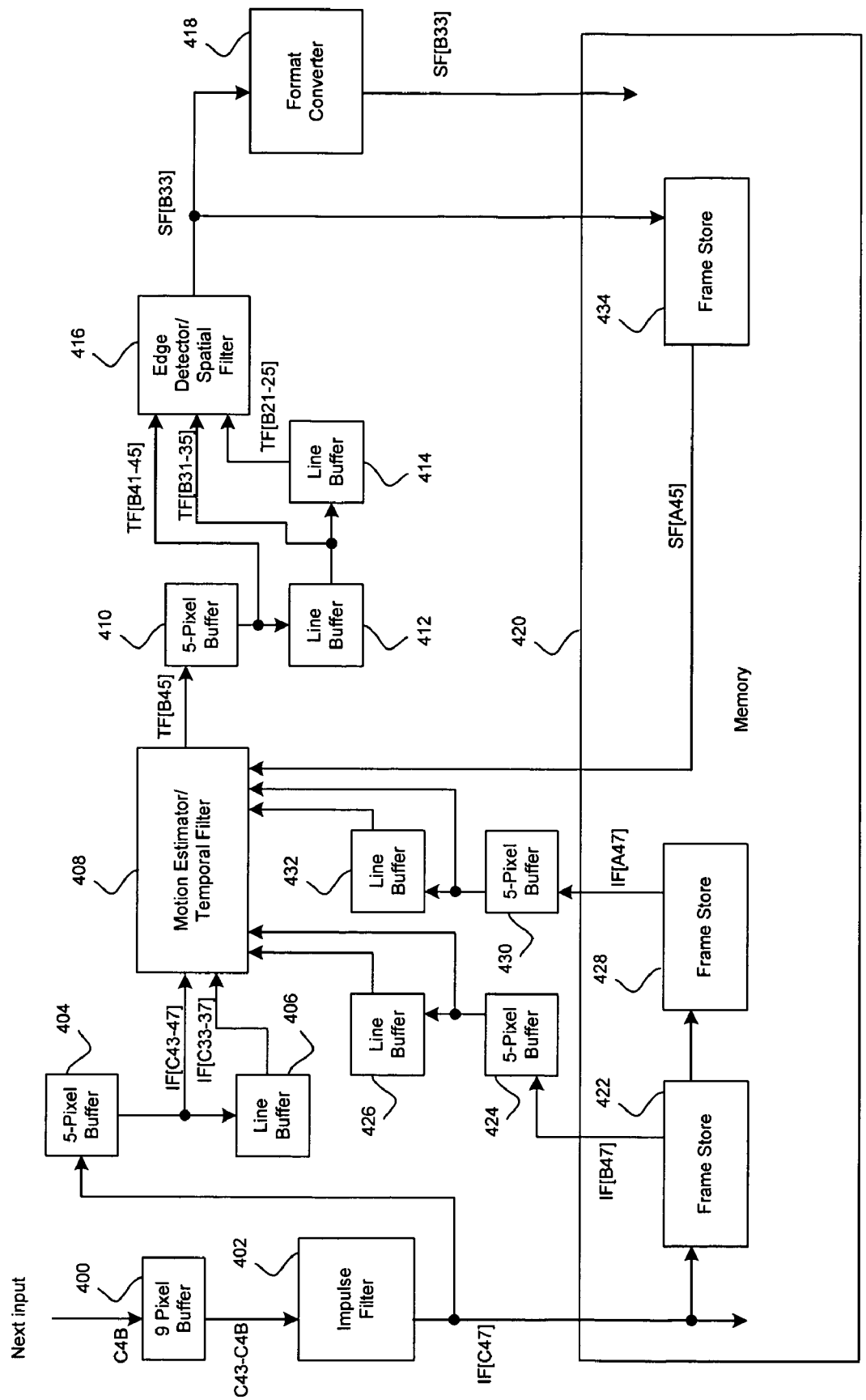
FIG. 4 is an implementation of exemplary video processing, in accordance with an embodiment of the invention.

FIG. 4 is an implementation of exemplary video processing, in accordance with an embodiment of the invention. Referring to FIG. 4, there is shown a 9-pixel buffer 400, an impulse filter 402, 5-pixel buffers 404, 410, 424, and 430, line buffers 406, 412, 414, 426 and 432, a motion estimator/temporal filter 408, an edge detector/spatial filter 416, a format converter 418, memory block 420, and frame stores 422, 428 and 434. The functionalities of the impulse filter 402, the format converter 418, the memory block 420, and the frame stores 422, 428, and 434 may be similar to that which is described in FIGS. 2a and 2b. The functionality of the motion estimator/temporal filter 408 may be similar to the functionalities of the motion estimator 202 and the temporal filter described in FIG. 2a. Similarly, the functionality of the edge detector/spatial filter 416 may be substantially similar to the functionalities of the edge detector 206 and the spatial filter 208 described in FIG. 2a.

The 9-pixel buffer 400 may comprise logic, circuitry and/or code that may be adapted to receive digital video signals and transfer digital data nine pixels at a time to its output. The 9-pixel buffer 400 may communicate data nine pixels at a time to the impulse filter 402. Similarly, the 5-pixel buffers 404, 410, 424, and 430 may comprise logic, circuitry and/or code that may be adapted to receive digital video signals and transfer digital data five pixels at a time to its output. The 5-pixel buffer 404 may communicate data five pixels at a time to the line buffer 408 and to the motion estimator/temporal filter 408. The 5-pixel buffer 410 may communicate five pixels of data at a time to the line buffer 412 and to the edge detector/spatial filter 416. The 5-pixel buffer 424 may communicate five pixels of data at a time to the line buffer 426 and to the motion estimator/temporal filter 408. The 5-pixel buffer 430 may communicate five pixels of data at a time to the line buffer 432 and to the motion estimator/temporal filter 408.

The line buffers 406, 412, 414, 426 and 432 may comprise logic, circuitry and/or code that may be adapted to receive the pixel data and delay the data by a time period equivalent to a horizontal line of pixels. The line buffers 406, 426 and 432 may communicate delayed data to the motion estimator/temporal filter 408. The line buffer 412 may communicate delayed data to the line buffer 414 and to the edge detector/spatial filter 416. The line buffer 414 may communicate delayed data to the edge detector/spatial filter 416. An output of the line buffer, for example, the line buffer 406, may be regarded as the data from a previous line with respect to the input to the same line buffer, for example, the line buffer 406.

For example, in operation for high memory bandwidth usage mode, the processing of luma pixels may start with pixel C4B as the input to the 9-pixel buffer 400. The output of this buffer may be the nine pixels C43 to 4B. These nine pixels may be communicated to the impulse filter 402, where they are filtered to produce the output IF[C47]. The IF notation may indicate impulse filtered data and C47 notation may indicate the corresponding pixel that was processed utilizing the notation discussed in FIG. 3. The IF[C47] may be communicated to the memory block 420, where the video data may be stored. The aggregate of stored video data may be impulse filtered 4:2:2 chroma subsampling format video signals that may be output, for example, by a peripheral component interconnect (PCI) capture/scanout circuit.

The IF[C47] may also be stored in frame stores 422 and 428. The frame store 422 may output the stored IF[C47] as IF[B47], where the IF[B47] may be delayed appropriately by a video frame period. The store frame 428 may output IF[A47], which may be delayed appropriately by two video frame periods with respect to the IF[C47]. Therefore, at an instant in time, the frame store 428 may output IF[A47] that may be regarded as a pixel from the previous frame, the frame store 422 may output IF[B47] that may be regarded as a pixel from the present frame, and the impulse filter 402 may output IF[C47] that may be regarded as a pixel from the next frame.

The IF[C47] may also be communicated to the 5-pixel buffer 404, which may group the pixel data from the impulse filter 402 five pixels at a time, and then communicate the pixel data to the line buffer 406 and to the motion estimator/temporal filter 408. The IF[B47] may be communicated to the 5-pixel buffer 424, which may group the pixel data from the frame store 422 five pixels at a time, and then communicate the pixel data to the line buffer 426 and to the motion estimator/temporal filter 408. Similarly, the IF[A47] may be communicated to the 5-pixel buffer 424, which may group the pixel data from the impulse filter 402 five pixels at a time, and then communicate the pixel data to the line buffer 406 and to the motion estimator/temporal filter 408.

Therefore, at a particular instant in time, the line buffers 406, 426, and 432 may output data for pixels that are from the previous line with respect to the 5-pixel buffers 404, 424, and 430. For example, the 5-pixel buffer 404 may communicate the five pixels IF[C43-47] and the line buffer 406 may output data from the previous line IF[C33-37] at the same time to the motion estimator/temporal filter 408. Similarly, the 5-pixel buffer 424 and the line buffer 426 may communicate the pixels IF[B43-47] and IF[B33-37], respectively, to the motion estimator/temporal filter 408. The 5-pixel buffer 430 and the line buffer 432 may also communicate the pixels IF[A4347] and IF[A33-37], respectively, to the motion estimator/temporal filter 408. The motion estimator/temporal filter 408 may utilize these input data, along with a previous output data from the frame store 434, to generate a filtered data TF[B45]. The TF notation may indicate that the pixel B45 is the output of the motion estimator/temporal filter 408. The pixel B45 may be the middle pixel of a 5-pixel neighborhood.

The pixel TF[B45] may be communicated to the 5-pixel buffer 410, and the output of the 5-pixel buffer 410 may be the pixels TF[41-45]. These pixels may be communicated to the line buffer 412 and to the edge detector/spatial filter 416. The output of the line buffer 416 may be communicated to the line buffer 414 and to the edge detector/spatial filter 416. The output of the line buffer 414 may be communicated to the edge detector/spatial filter 416. At an instant in time, the outputs of the 5-pixel buffer 410, and the line buffers 412 and 414 may be TF[41-45], TF[31-35] and TF[21-25], respectively. The edge detector/spatial filter 416 may process the input data from the 5-pixel buffer 410 and the line buffers 412 and 414 to generate spatially filtered data for a pixel, for example, for the pixel SF[B33]. The notation SF notation may indicate that the pixel B33 has been spatially filtered. The output pixel SF[B33] from the edge detector/spatial filter 416 may be the middle pixel of the five pixels TF[31-35] communicated to the edge detector/spatial filter 416.

The output pixel SF[B33] may be communicated to the format converter 418 and to the frame store 434. The frame store 434 may store the pixel data and output the pixel data after an appropriate delay of approximately one video frame period. The output data from the frame store 434 may be communicated to the motion estimator/temporal filter 408 such that the pixel data may be delayed by about one video frame period with respect to the pixel being processed by the motion estimator/temporal filter 408. For example, if the motion estimator/temporal filter 408 is processing video data to generate the pixel TF[B45], then at that time instant, the data from the frame store 434 may be SF[A45], and the pixel being communicated to the frame store 434 by the edge detector/spatial filter 416 may be SF[B32].

The format converter 418 may convert the video data for the pixels from the 4:2:2 chroma subsampling format to the 4:2:0 chroma subsampling format. This converted 4:2:0 chroma subsampling format video output may be communicated to the memory block 418 and stored. The aggregate of the stored video data may be a fully processed output that may be appropriate for compression, for example, utilizing MPEG compression methods, or for conversion to analog video signal for viewing. A similar process may occur for chroma pixels. However, chroma dataflow may be different because the chroma horizontal resolution may be half of the luma horizontal resolution.

Figure 5:
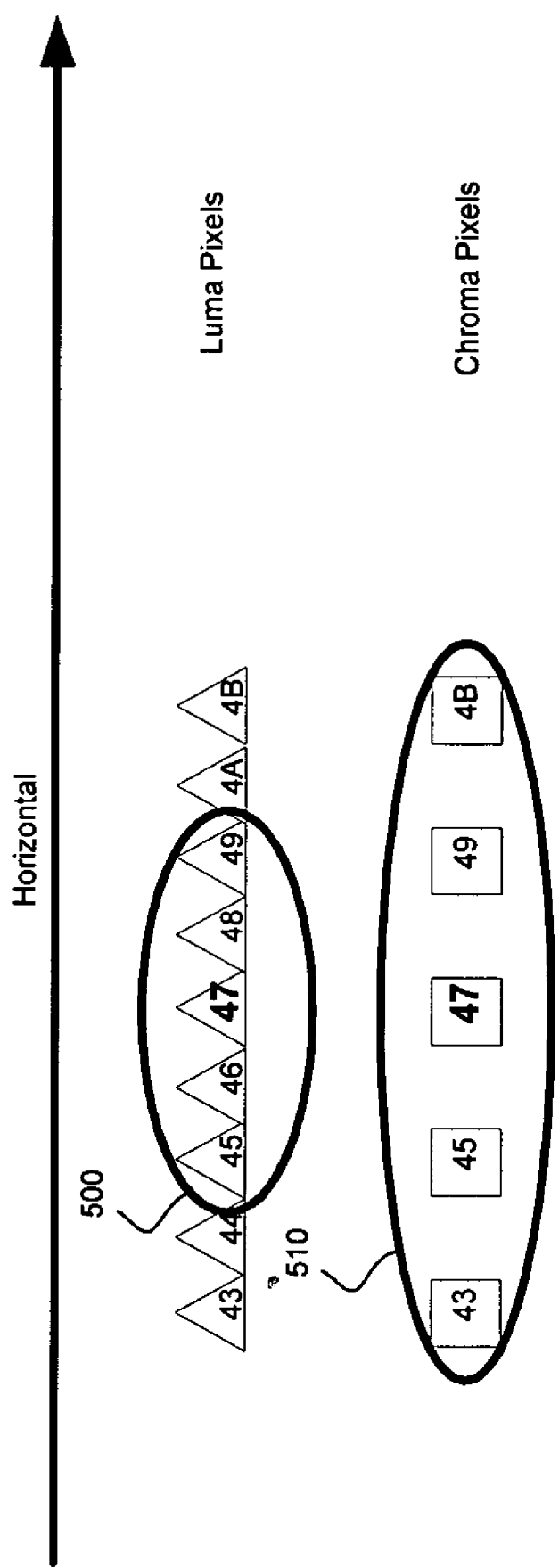
FIG. 5 illustrates a pixel constellation for the impulse filter of FIG. 4, in accordance with an embodiment of the invention.

FIG. 5 is a pixel constellation for the impulse filter of FIG. 4, for example, in accordance with an embodiment of the invention. Referring to FIG. 5, there is shown a pixel constellation for the impulse filter, for example, the impulse filter 402 (FIG. 4), for both luma and chroma processing. For illustrative purposes, the luma pixels are represented by triangles and the chroma pixels are represented by squares. Since the input has the 4:2:2 chroma subsampling video format, the luma pixels may have different resolutions than the chroma pixels. Specifically, the chroma pixels may have one-half of the horizontal resolution of the luma pixels. To maintain consistency with FIG. 4, pixel 47 may be the pixel of interest for both luma and chroma processing, and the pixels inside the circles 500 and 510 may indicate the pixels that lie in the 1×5 neighborhoods for luma and chroma, respectively. The 1×5 notation may indicate that five pixels are in the same horizontal line. The 9-pixel buffer 400 (FIG. 4) may have been used to prepare the input to the impulse filter 402. This may allow the appropriate 1×5 chroma neighborhood to be used for chroma processing even though only five of the nine pixels may be used for luma processing.

Figure 6A:
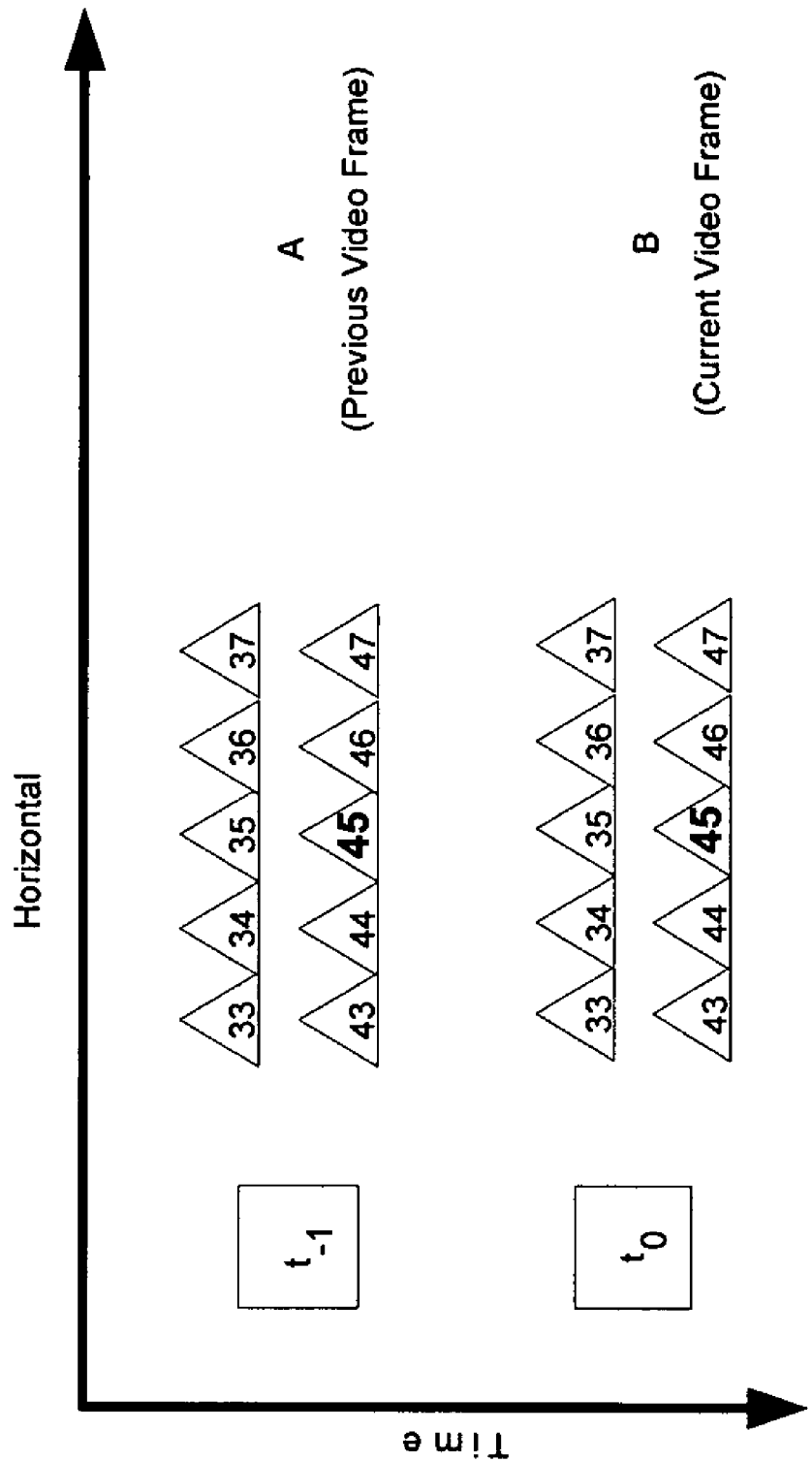
FIG. 6a illustrates a pixel constellation for motion estimation by exemplary system in FIG. 4 utilizing low memory bandwidth usage mode, in accordance with an embodiment of the invention.

FIG. 6a illustrates a pixel constellation for motion estimation by exemplary system in FIG. 4 utilizing low memory bandwidth usage mode, in accordance with an embodiment of the invention. Referring to FIG. 6a, there is shown a 2×5 neighborhood about the pixel B45 in the present video frame, and about the pixel A45 in the previous video frame, as required by the low memory bandwidth usage mode. To maintain consistency with FIG. 4, pixel B45 may be the pixel of interest. The motion estimator/temporal filter 408 may utilize these pixels for motion estimation and temporal filtering of pixel B45. The pixels shown may be luma pixels since motion estimation only utilizes the luma pixels. However, temporal filtering may be done on both luma and chroma pixels.

Figure 6B:
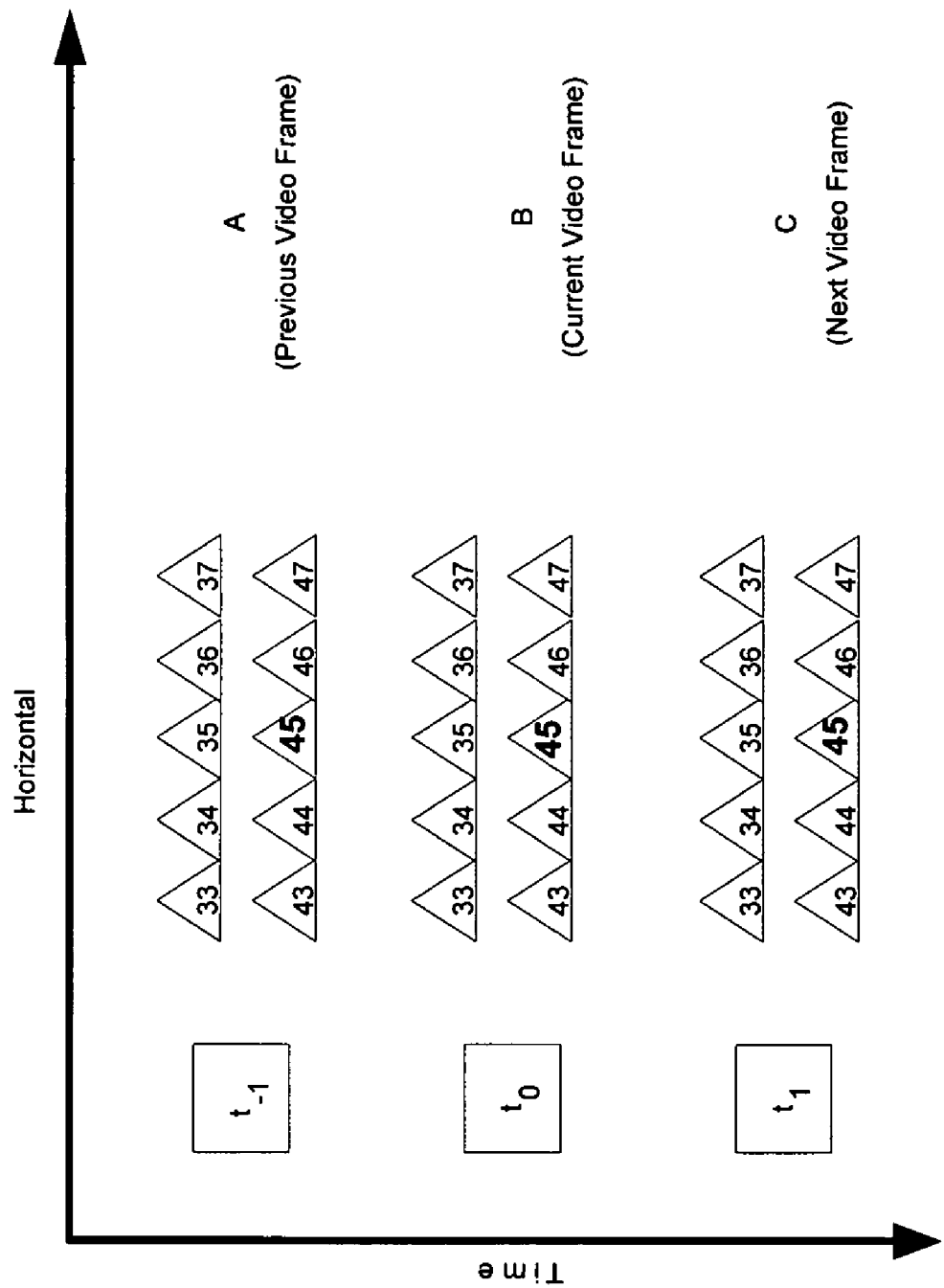
FIG. 6b illustrates a pixel constellation for motion estimation by exemplary system in FIG. 4 utilizing medium or high memory bandwidth usage mode, in accordance with an embodiment of the invention.

FIG. 6b illustrates a pixel constellation for motion estimation by exemplary system in FIG. 4 utilizing medium or high memory bandwidth usage mode, in accordance with an embodiment of the invention. Referring to FIG. 6b, there is shown a 2×5 neighborhood about the pixel B45 in the present video frame, about the pixel A45 in the previous video frame, and about the pixel C45 in the next video frame, as required by the medium or high memory bandwidth usage mode. To maintain consistency with FIG. 4, pixel B45 may be the pixel of interest. The motion estimator/temporal filter 408 may utilize these pixels for motion estimation and temporal filtering of pixel B45. The pixels shown may be luma pixels since motion estimation only utilizes the luma pixels. However, temporal filtering may be done on both luma and chroma pixels.

Figure 7:
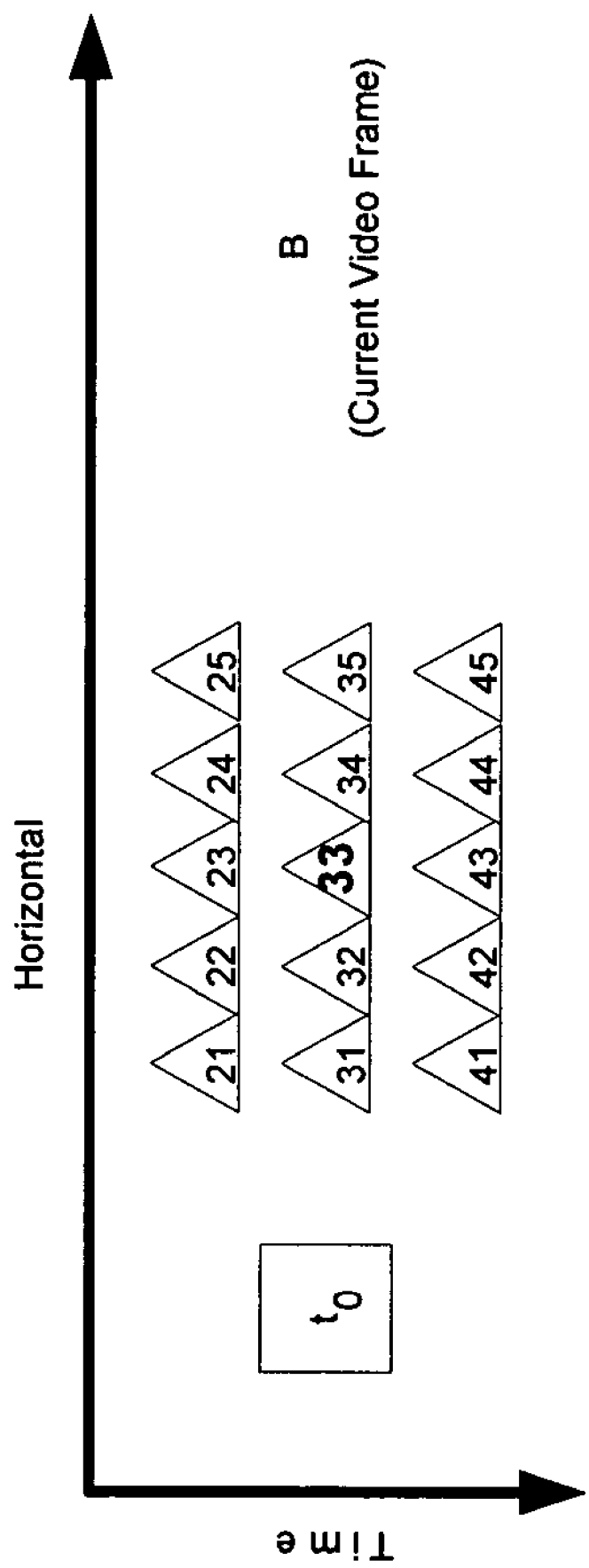
FIG. 7 illustrates a pixel constellation for edge detection by exemplary system in FIG. 4, in accordance with an embodiment of the invention.

FIG. 7 illustrates a pixel constellation for edge detection by exemplary system in FIG. 4, in accordance with an embodiment of the invention. Referring to FIG. 7, there is shown the pixel constellation for edge detection, for example, by the edge detector/spatial filter 416. To maintain consistency with FIG. 4, pixel B33 may be the pixel of interest for both luma and chroma processing by the edge detector/spatial filter 416. A 3×5 neighborhood of pixels may be required due to the use of the three pixel horizontal window of values computed using 3×3 Sobel filters for edge detection. The 3×5 notation may indicate that there are five pixels in the same horizontal positions in three adjacent horizontal lines. The 3×3 notation may indicate that the Sobel filters operate on three pixels in the same horizontal positions in three adjacent lines.

Figure 8:
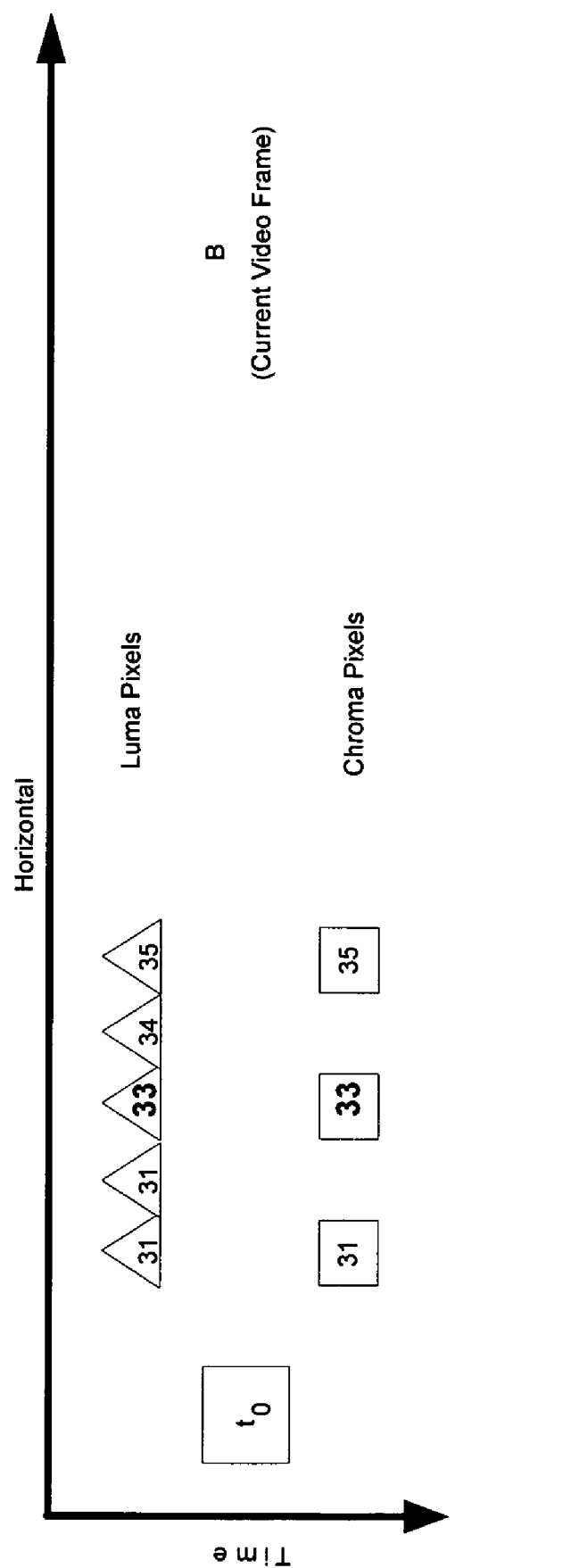
FIG. 8 illustrates a pixel constellation for spatial filtering by exemplary system in FIG. 4, in accordance with an embodiment of the invention.

FIG. 8 illustrates a pixel constellation for spatial filtering by exemplary system in FIG. 4, in accordance with an embodiment of the invention. Referring to FIG. 8, there is shown pixel constellations for both luma and chroma spatial filtering, for example, by the edge detector/spatial filter 416. For illustrative purposes, the luma pixels are represented by triangles and the chroma pixels are represented by squares. The chroma pixels may appear at one-half the resolution rate of the luma pixels, as required by the 4:2:2 chroma subsampling video format. To maintain consistency with FIG. 4, pixel B33 may be the pixel of interest for both luma and chroma processing.

Figure 9:
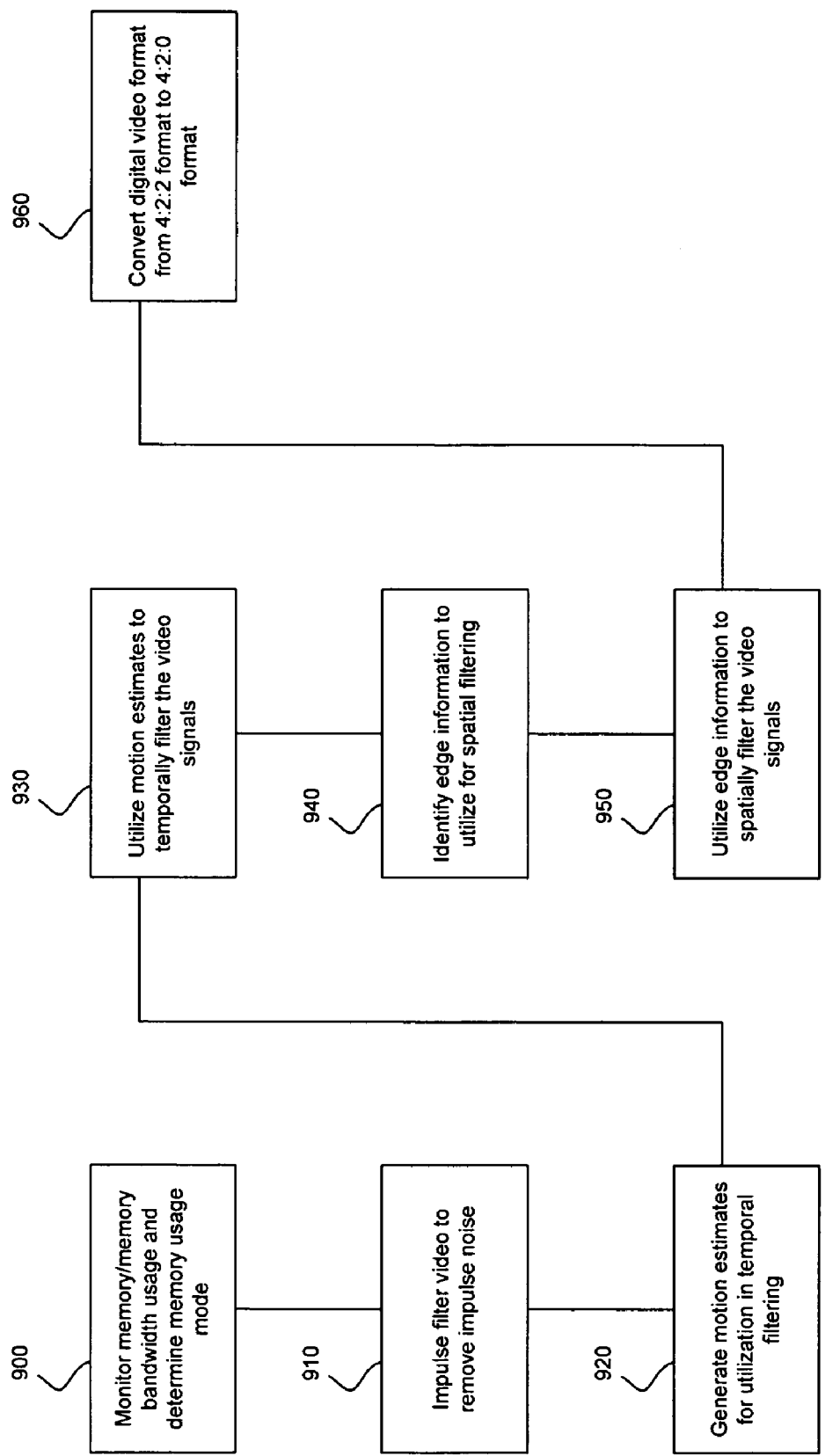
FIG. 9 illustrates an exemplary flow diagram illustrating processing video, in accordance with an embodiment of the invention.

FIG. 9 is an exemplary flow diagram illustrating processing video, in accordance with an embodiment of the invention. Referring to FIG. 9, step 900 comprises monitoring memory usage and memory bandwidth usage, and determining a memory usage model that is to be utilized for filtering digital video signals. In step 910, digital video signals may be impulse filtered to remove impulse noise that may not be visually pleasing to viewers and/or hamper compression. In step 920, motion estimation information is generated, which may be utilized for temporal filtering of the digital video signals. In step 930, the motion estimation information is utilized to temporally filter the digital video signals. In step 940, edge information is identified and utilized for spatial filtering of the digital video signals. In step 950, the edge information is utilized to spatially filter the digital video signals. In step 960, the spatially filtered digital video signal output is converted from the 4:2:2 chroma subsampling video format to the 4:2:0 chroma subsampling video format.

Referring to FIGS. 1c, 2d and 9, the steps 900 to 960 may be utilized to reduce noise in digital video signals. In step 900, a controller, for example, the controller block 128, may monitor memory usage and/or memory bandwidth usage, for example, for the memory block 120. If the memory usage and/or memory bandwidth usage is lower than a low activity threshold, the controller block 128 may indicate that high memory bandwidth usage mode may be appropriate for noise reduction. If the memory usage and/or memory bandwidth usage is higher than a high activity threshold, the controller block 128 may indicate that low memory bandwidth usage mode may be appropriate for noise reduction. Otherwise, the controller block 128 may indicate that a medium memory bandwidth usage mode may be appropriate for noise reduction. The threshold values may be implementation dependent on a variety of factors, for example, the total amount of memory available, the number of processes that may be accessing the memory, burstiness of the memory accesses, and the access speed of memory.

In step 910, the digital video signals may be received by the impulse filter 200, and the impulse filter 200 may remove impulse noise in the digital video signals. Impulse noises may be pixels whose intensity values are much larger or much smaller than the values of the neighboring pixels. The impulse filter 200 may utilize an algorithm where the detection of impulse noise may be performed identically for both luma and chroma pixels using a local 1×5 neighborhood of the pixel of interest. The pixel of interest may be called an impulse pixel. In cases where the impulse pixel intensity may be greater than the maximum value of every other pixel in the neighborhood plus an adjustable offset, the impulse pixel may be replaced by the maximum pixel in the neighborhood. In cases where the impulse pixel intensity may be less than a minimum value of every other pixel in the neighborhood plus an adjustable offset, the impulse pixel may be replaced by a minimum pixel in the neighborhood. Separate offsets may be defined in either case for processing luma and chroma pixels.

For those pixels that do not have a valid 1×5 pixel neighborhood, for example, pixels whose 1×5 neighborhoods lie outside the picture, pixels on the picture boundary may be replicated to create a valid neighborhood for the impulse filtering. Accordingly, the impulse filter may use a smaller neighborhood for comparison with the pixel of interest. The impulse filter 200 may communicate the filtered digital video signals to the motion estimator 202, the temporal filter 204, to the frame store 214, and/or to the memory block 212 for the low memory bandwidth usage mode. The impulse filter 200 may communicate the filtered digital video signal to the frame store 216 for medium and high memory bandwidth usage modes.

In step 920, the digital signal may be received by the motion estimator 202, and the motion estimator 202 may generate estimates indicating motion of pixels relative to adjacent video frames. Motion estimation may be generated based on luma pixels since there may be fewer chroma pixels than luma pixels. Algorithms used for motion estimation may vary depending on the memory bandwidth usage mode. In the low memory bandwidth usage mode, a pixel of interest in the present video frame may be compared to a collocated pixel in a previous video frame. The absolute difference of the pixel values between the pixel of interest and the collocated pixel in the previous video frame may be calculated for each pixel. This value may be referred to as $D(x,y,t)$, where "x" may indicate a column, "y" may indicate a row, and "t" may indicate time. The present video frame may be the video data generated as an output of the impulse filter 200. The previous video frame may be acquired from the frame store 214. In case of a first video frame that may not have a valid previous video frame, motion estimation may not need to be performed since temporal filtering may not be possible without the previous video frame.

In the medium and high memory bandwidth usage modes, the collocated pixels in the previous and subsequent video frames may be used for motion estimation. The present video frame may be communicated by the frame store 214 and the previous video frame may be communicated by the frame store 216. The subsequent video frame may be communicated by the impulse filter 200. The value $D(x,y,t)$ may be calculated for each pixel as the maximum of the three collocated pixels minus the minimum of the three collocated pixels. In cases of the first and last video frames that may only have one neighboring video frame, motion estimation and/or temporal filtering may not need to be performed.

The maximum value of $D(x,y,t)$ in the local 2×5 neighborhood may be calculated for every pixel. The maximum value may be right-shifted by an implementation dependent value MOTION_QUANT to generate $M(x,y,t)$. $M(x,y,t)$ may be interpreted as the local motion, with small values representing low amounts of motion and high values representing high amounts of motion. $M(x,y,t)$ may be communicated to the temporal filter 204. For those pixels that do not have a valid 2×5 neighborhood, for example, pixels whose 2×5 neighborhoods lie outside the picture, pixels on the picture boundary may be replicated to create a valid neighborhood for the motion detection. Since the motion window may compute the neighborhood maximum, this may be equivalent to taking the maximum over a smaller window of valid pixels.

In step 930, the temporal filter 204 may be adapted to temporally filter the digital video signals. In low memory bandwidth usage mode the temporal filter may be adapted to receive digital video signals from the impulse filter 200, motion estimates from the motion estimator 202, and digital video signals, from the frame store 214. In medium memory bandwidth usage mode, the temporal filter 204 may additionally receive digital video signals from the frame store 216. In high memory bandwidth usage mode, the temporal filter 204 may also receive digital video signals from the frame store 218. The temporal filter 204 may map the per pixel motion estimation to an alpha blend level that controls the amount of temporal filtering performed.

Each luma pixel may first be checked against the collocated pixel in the previous video frame and pixels with very large differences may not be filtered. Similarly, each chroma pixel may be checked against the collocated pixel in the previous video frame. However, if either of the chroma component pixels have very large differences, the chroma pixels may not be filtered. The same algorithm may be utilized to filter the pixels independently of whether those pixels are luma or chroma. However, the filtering algorithm may vary depending on the memory bandwidth usage mode. The filtered digital video signals may be communicated to the edge detector 206 and to the spatial filter 208.

In step 940, the edge detector 206 may identify edge information and this information may be communicated to the spatial filter 208. Edge detection may be performed only on luma pixels since luma pixels may have been sampled at a higher sampling rate than the chroma pixels. An exemplary edge detection may be performed utilizing 3×3 Sobel filters, one for horizontal edges and one for vertical edges. For those pixels that do not have a valid 3×3 neighborhood, for example, pixels whose 3×3 neighborhoods lie outside the video frame, pixels on the video frame boundary may be replicated to create a valid neighborhood for the edge detection. The maximum of the absolute value of the two outputs of the two Sobel filters may be used to represent the edge activity for each pixel. The maximum edge activity in a three pixel horizontal window around the pixel of interest may be computed as the local edge activity. $E(x,y,t)$ may represent this measured edge activity, and this may be communicated to the spatial filter 208.

In step 950, the spatial filter 208 may receive the digital video signals from the temporal filter 204 and the edge information from the edge detector 206. Although the measured edge activity $E(x,y,t)$ may be calculated from only the luma pixels, the spatial filter 208 may apply it differently for adaptive spatial filtering of the luma and chroma pixels. The spatial filter 208 may be adapted to filter only pixels that do not exhibit high edge activity since high spatial activity may tend to mask noise. The spatial filter 208 may filter adaptively based on the strength of the edge detected. For example, a stronger filter may be applied when a low amount of edge detail is detected.

The spatial filter 208 may utilize the same threshold values for both luma and chroma pixels in deciding whether to filter the pixel or not, but the filter algorithm may be different for luma and chroma pixels. A 1×5 neighborhood may be used for filtering luma pixels, while a 1×3 neighborhood may be used for filtering chroma pixels. For those luma pixels that do not have a valid 1×5 neighborhood, for example, pixels whose 1×5 neighborhoods lie outside the video frame, pixels on the video frame boundary may be replicated to create a valid neighborhood for adaptive luma spatial filtering. Similarly, for those pixels that do not have a valid 1×3 neighborhood, for example, the pixels whose 1×3 neighborhoods lie outside the video frame, pixels on the video frame boundary may be replicated to create a valid neighborhood for adaptive chroma spatial filtering. The spatially filtered video signals may be communicated to the format converter 210. For high memory bandwidth usage mode, the filtered video signals may also be communicated to the frame store 218.

In step 960, the format converter 210 may convert video data from a 4:2:2 chroma subsampling format to a 4:2:0 chroma subsampling format. The 4:2:2 chroma subsampling format may comprise video data where the chroma is horizontally sampled at one-half the horizontal sampling rate of the luma, and where the chroma is vertically sampled at the same vertical sampling rate as the luma. The 4:2:0 chroma subsampling format may comprise video data where the chroma is sampled at one-half the horizontal sampling rate of the luma and at one-half the vertical sampling rate of the luma. The converted digital video signals may be communicated to the memory block 212 to be stored. The stored digital video signals may be output for further digital processing, for example, to a video encoder, such as, for example, the VEC 114, which may output analog video for viewing.

Additionally, the 4:2:2 chroma subsampling format video output of an embodiment of the invention may be clipped to be between 1 and 254 so as not to violate International Radio Consultative Committee (CCIR) 656 requirements where the pixel values of 0 and 255 are not permitted. For example, if this clipping is appended to the spatial filter architecture, clipping may be performed even if the spatial filter, for example, the spatial filter 208 (FIG. 2a), is disabled. Clipping may be relevant when the 4:2:2 chroma subsampling format video output is an input to the 4:2:2 to 4:2:0 format converter 210 (FIG. 2a). Clipping may also be relevant when the 4:2:2 chroma subsampling format output of the impulse filter 200 (FIG. 2a) may be stored in the memory block 212 (FIG. 2a) for PCI capture and/or scanout. It may be noted that since the impulse filter 200 may only replace a pixel with that of one of its neighbors, if a valid CCIR 656 video input is presented to the impulse filter, then a valid CCIR 656 video output may be generated by the impulse filter 200.

Since exemplary filtering, whether impulse, temporal, and/or spatial, may have been described above as utilizing multiply operations, the invention may be implemented in software, firmware, and/or machine code, and/or utilizing hardware multipliers, for example. Additionally, adders and/or shifting operations may be utilized since the coefficients may be constant and may be split into sums of powers of two. While only motion information may be used to guide temporal filtering and only edge information may be used to guide spatial filtering, the invention need not be limited in this manner. In this regard, the motion information and/or the edge information may be used to guide temporal filtering and/or spatial filtering.

While an embodiment of the invention may generate two outputs, the 4:2:2 chroma subsampling format output video may pass only through the impulse filter, and the fully processed 4:2:0 chroma subsampling format output video, the invention need not be limited in this manner. Other output video may be stored in the memory block, for example, the memory block 420 (FIG. 4), and output as desired. Various embodiments of the invention may be adapted to process either progressive, interlaced or 3:2 pulldown video content with only slight change to some parameters. In this regard, the 3:2 pulldown video may be native progressive format coded as interlaced material. This information may be determined externally and provided to an embodiment of the invention for processing. An implementation of the invention may set the default video type to interlaced.

Although the memory bandwidth usage modes may have been described as high, medium and low memory bandwidth usage modes, the invention need not be limited so. In this regard, the number of memory bandwidth usage modes may be different than the three enumerated. For example, there may be five memory bandwidth usage modes. As the number of modes is varied, various portions of an embodiment of the invention, for example, the motion estimator 202 (FIG. 2a), may be adapted to adjust its method of function depending on one or more of the memory bandwidth usage modes.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
monitoring one or both of memory usage and/or memory bandwidth usage of memory utilized to process video data pixel-by-pixel for successive time instants; and
adaptively adjusting filtering of said video data pixel-by-pixel for said successive time instants according to said monitoring and corresponding chroma and/or luma information.

2. The method according to claim 1, comprising utilizing at least one of impulse filtering, temporal filtering, and spatial filtering for said filtering of said video data pixel-by-pixel for said successive time instants.

3. The method according to claim 2, comprising adaptively adjusting said at least one of said impulse filtering, said temporal filtering, and said spatial filtering pixel-by-pixel for said successive time instants based on said monitoring.

4. The method according to claim 2, comprising estimating from said video data pixel-by-pixel for said successive time instants said one or both of motion information and edge information for utilizing in said at least one of said impulse filtering, said temporal filtering, and said spatial filtering.

5. The method according to claim 4, comprising adaptively adjusting said at least one of said estimated motion information and said estimated edge information pixel-by-pixel for said successive time instants based on said monitoring.

6. The method according to claim 4, comprising adaptively adjusting said at least one of said impulse filtering, said temporal filtering, and said spatial filtering pixel-by-pixel for said successive time instants utilizing said at least one of said estimated motion information and said estimated edge information.

7. The method according to claim 4, comprising generating said at least one of said estimated motion information and said estimated edge information pixel-by-pixel utilizing at least one of a luma portion and a chroma portion of said video data for said successive time instants.

8. The method according to claim 2, wherein said impulse filtering, said temporal filtering, and said spatial filtering are utilized in a determined order.

9. The method according to claim 1, comprising selecting a memory bandwidth usage mode pixel-by-pixel based on said monitoring.

10. A system for processing video, the system comprising:
one or more circuits comprising a controller, wherein said one or more circuits are operable to monitor one or both of memory usage and/or memory bandwidth usage of memory utilized to process video data pixel-by-pixel for successive time instants; and
said one or more circuits are operable to adjust filtering of said video data pixel-by-pixel for said successive time instants according to said and corresponding chroma and/or luma information.

11. The system according to claim 10, wherein said one or more circuits comprise at least one of impulse filter, temporal filter, and spatial filter that is utilized to said filter said video data pixel-by-pixel for said successive time instants.

12. The system according to claim 11, wherein said one or more circuits are operable to adaptively adjust said at least one of said impulse filter, said temporal filter, and said spatial filter pixel-by-pixel for said successive time instants based on said monitoring.

13. The system according to claim 11, wherein said one or more circuits are operable to estimate from said video data pixel-by-pixel for said successive time instants said one or both of motion information and edge information for utilizing in said at least one of said impulse filter, said temporal filter, and said spatial filter.

14. The system according to claim 13, wherein said one or more circuits are operable to adaptively adjust said at least one of said estimated motion information and said estimated edge information pixel-by-pixel for said successive time instants based on said monitoring.

15. The system according to claim 13, wherein said one or more circuits are operable to utilize said at least one of said estimated motion information and said estimated edge information to adaptively adjust said at least one of said impulse filter, said temporal filter, and said spatial filter pixel-by-pixel for said successive time instants.

16. The system according to claim 13, wherein said one or more circuits comprise a motion estimator that generates said estimated motion information pixel-by-pixel utilizing at least one of a luma portion and a chroma portion of said video data for said successive time instants.

17. The system according to claim 13, wherein said one or more circuits comprise an edge detector that generates said estimated edge information pixel-by-pixel utilizing at least one of a luma portion and a chroma portion of said video data for said successive time instants.

18. The system according to claim 13, wherein said impulse filter, said temporal filter, and said spatial filter are utilized in a determined order.

19. The system according to claim 10, wherein said one or more circuits are operable to select a memory bandwidth usage mode pixel-by-pixel based on said monitoring.

20. The method according to claim 1, comprising estimating one or both of motion information and/or edge information for said adaptively adjusted filtered pixel-by-pixel video data for said successive time instants, wherein said estimation of said one or both of said motion information and said edge information is handled differently depending on said one or both of said monitored memory usage and/or memory bandwidth usage.

21. The system according to claim 10, wherein said one or more circuits are operable to estimate one or both of motion information and/or edge information for said adaptively adjusted filtered pixel-by-pixel video data for said successive time instants, wherein said estimation of said one or both of said motion information and said edge information is handled differently depending on said one or both of said monitored memory usage and/or memory bandwidth usage.

22. A method for processing video, the method comprising:
monitoring one or both of memory usage and/or memory bandwidth usage of memory utilized to process video data pixel-by-pixel for successive time instants;
adaptively adjusting filtering of said video data pixel-by-pixel for said successive time instants according to said monitoring and a corresponding pixel type; and
converting a video chroma subsampling format of said video data for said successive time instants according to said monitoring.

23. A method for processing video, the method comprising:
monitoring one or both of memory usage and/or memory bandwidth usage of memory utilized to process video data pixel-by-pixel for successive time instants;
adaptively adjusting filtering of said video data pixel-by-pixel for said successive time instants according to said monitoring and a corresponding pixel type; and
converting a video chroma subsampling format of said video data for said successive time instants from a 4:2:2 chroma subsampling format to a 4:2:0 chroma subsampling format according to said monitoring.

24. A system for processing video, the system comprising:
one or more circuits comprising a controller, wherein said one or more circuits are operable to monitor one or both of memory usage and/or memory bandwidth usage of memory utilized to process video data pixel-by-pixel for successive time instants;
said one or more circuits are operable to adjust filtering of said video data pixel-by-pixel for said successive time instants according to said monitoring and a corresponding pixel type, said one or more circuits comprise a format converter that converts a video chroma subsampling format of said video data for said successive time instants according to said monitoring; and
said one or more circuits comprise a format converter that converts a video chroma subsampling format of said video data for said successive time instants from a 4:2:2 chroma subsampling format to a 4:2:0 chroma subsampling format according to said monitoring.

25. A system for processing video, the system comprising:
one or more circuits comprising a controller, wherein said one or more circuits are operable to monitor one or both of memory usage and/or memory bandwidth usage of memory utilized to process video data pixel-by-pixel for successive time instants;
said one or more circuits are operable to adjust filtering of said video data pixel-by-pixel for said successive time instants according to said monitoring and a corresponding pixel type, and said one or more circuits comprise a format converter that converts a video chroma subsampling format of said video data for said successive time instants according to said monitoring.

* * * * *